Sept. 2, 1969        F. H. TENNIS        3,464,443
PILOT CONTROLLABLE VALVE MECHANISM
Filed Oct. 19, 1967        10 Sheets-Sheet 1
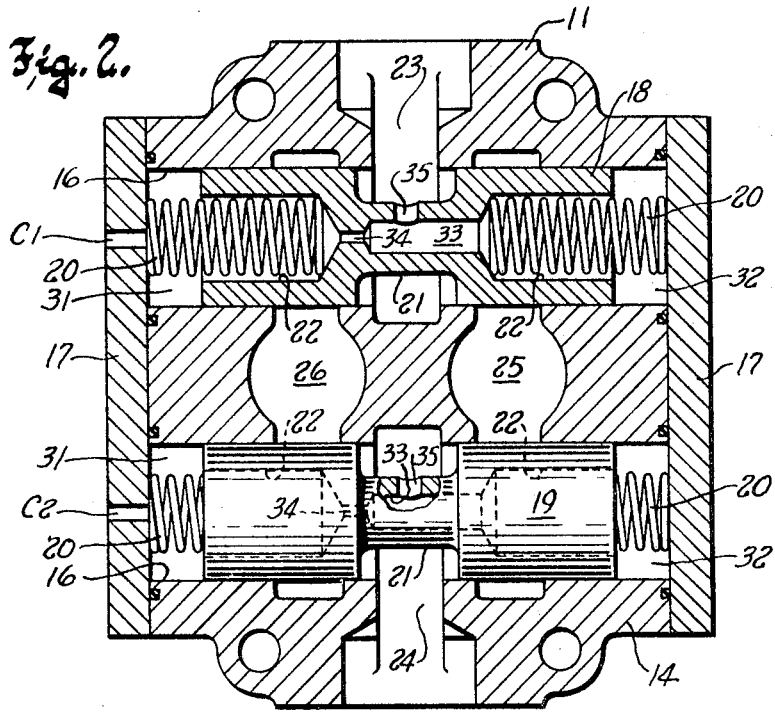
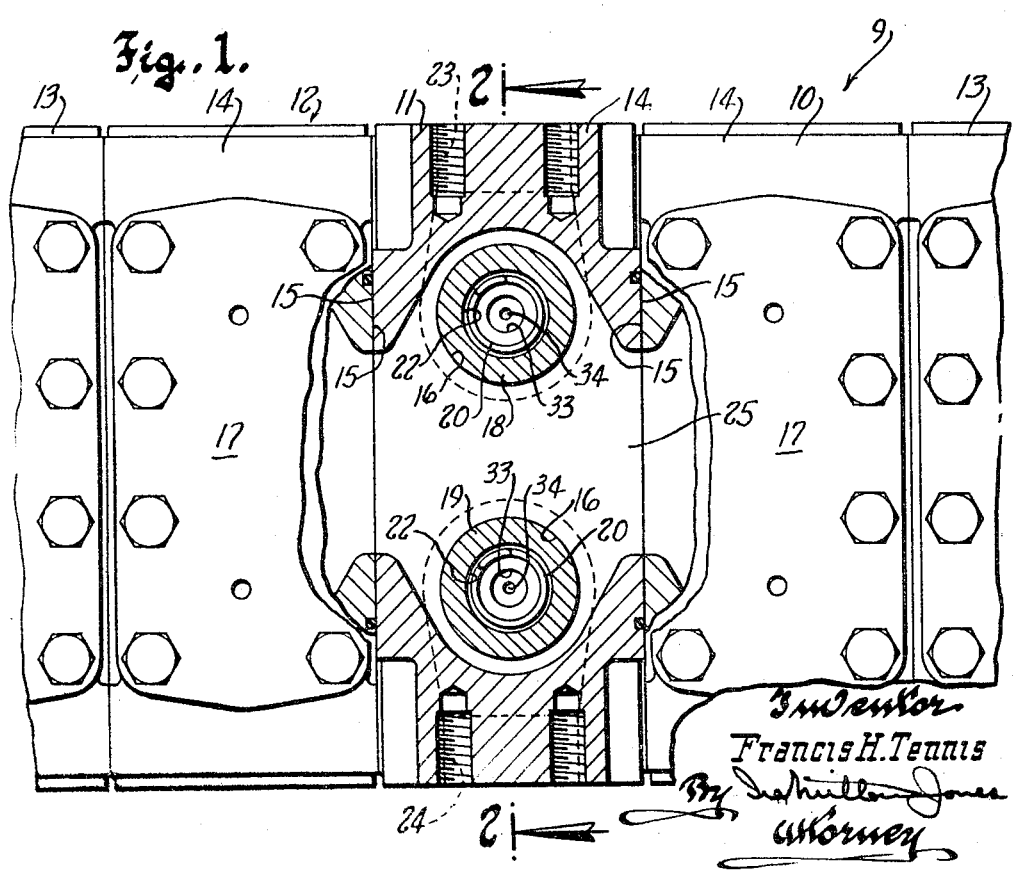
Inventor
Francis H. Tennis Sept. 2, 1969 F. H. TENNIS 3,464,443
PILOT CONTROLLABLE VALVE MECHANISM
Filed Oct. 19, 1967 10 Sheets-Sheet 2
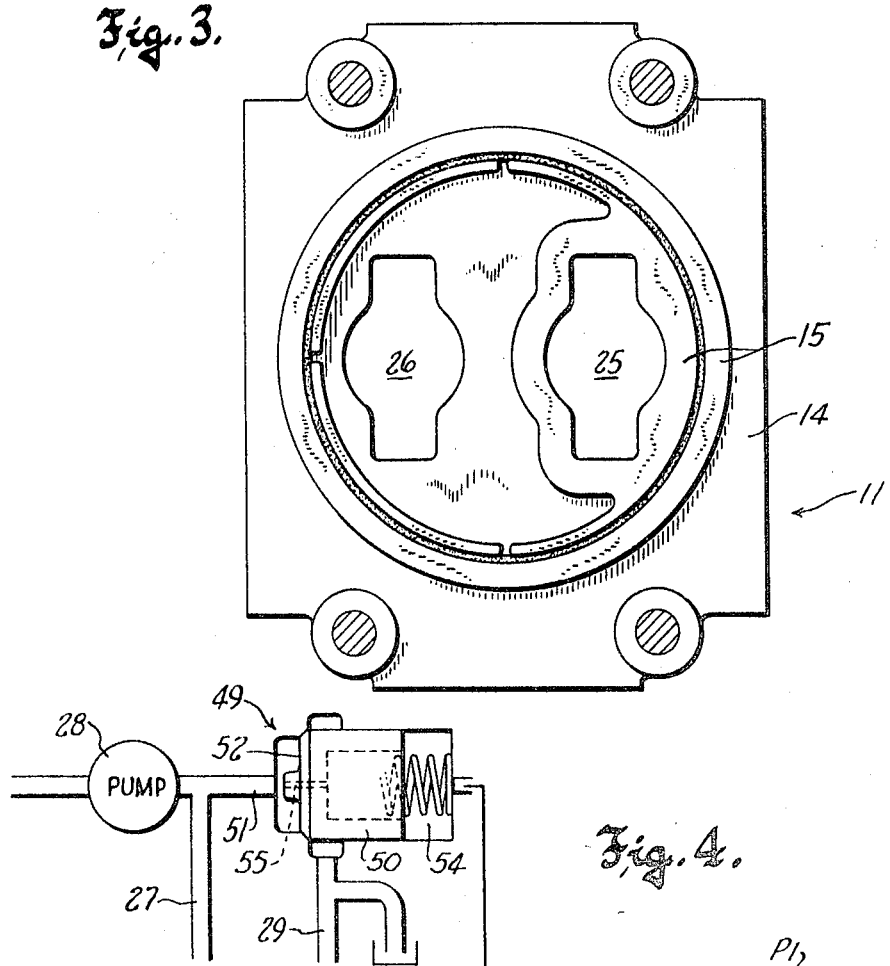
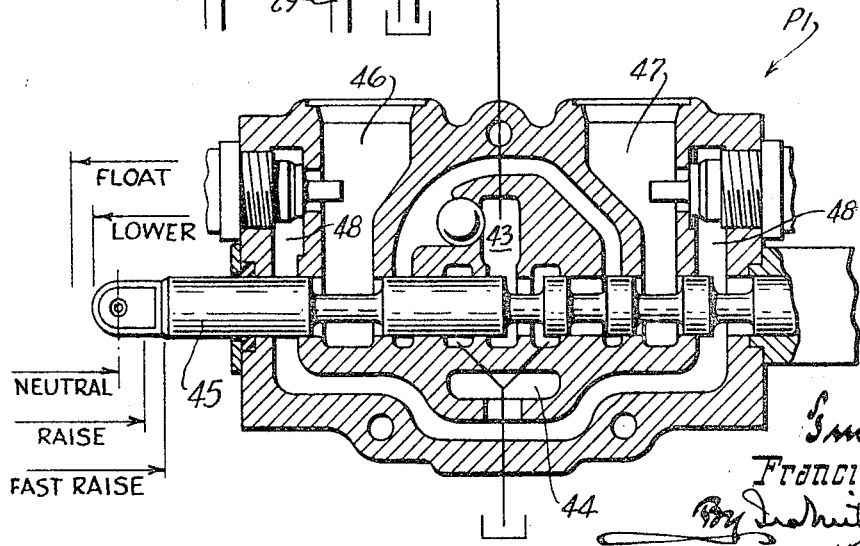
Inventor
Francis H. Tennis

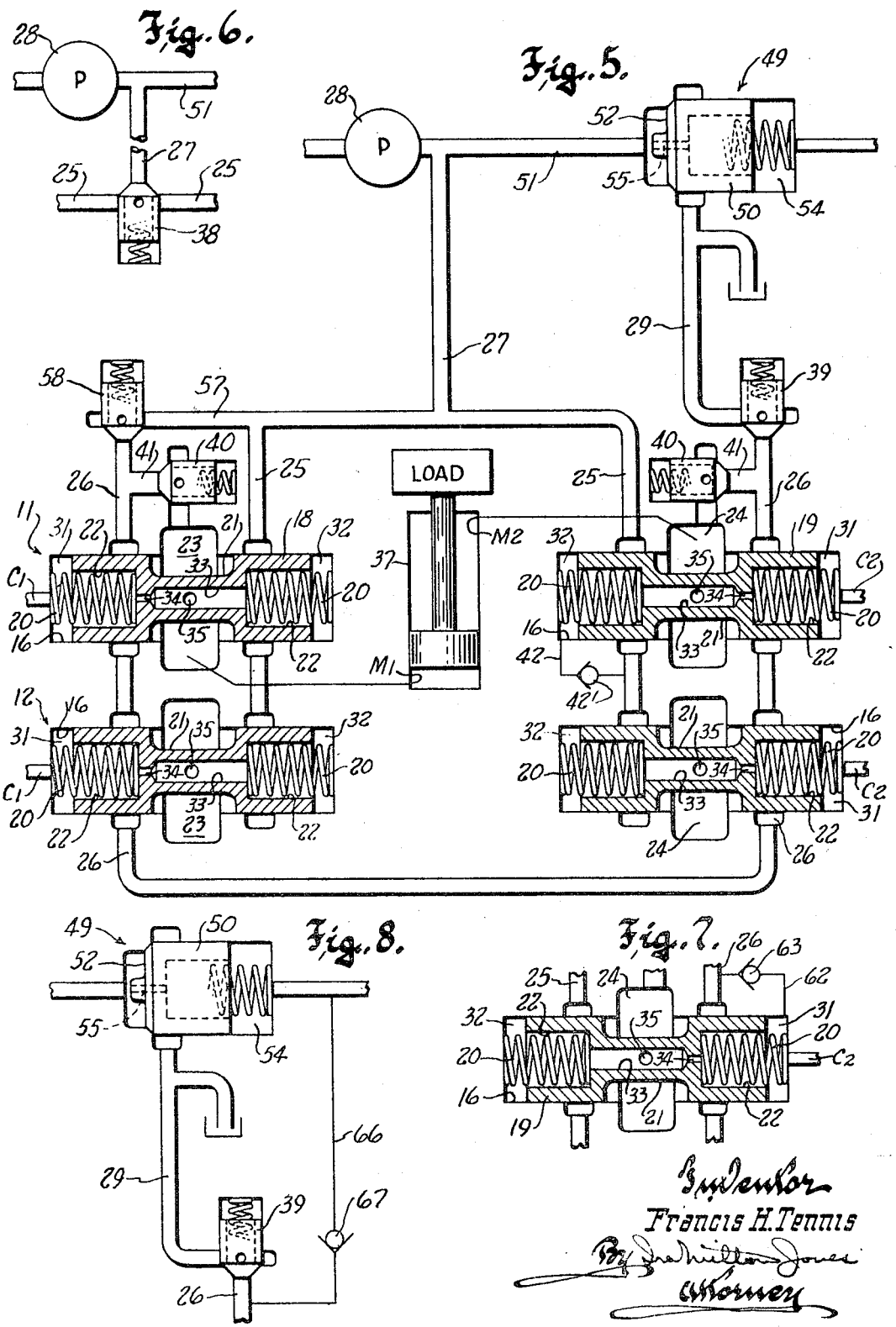

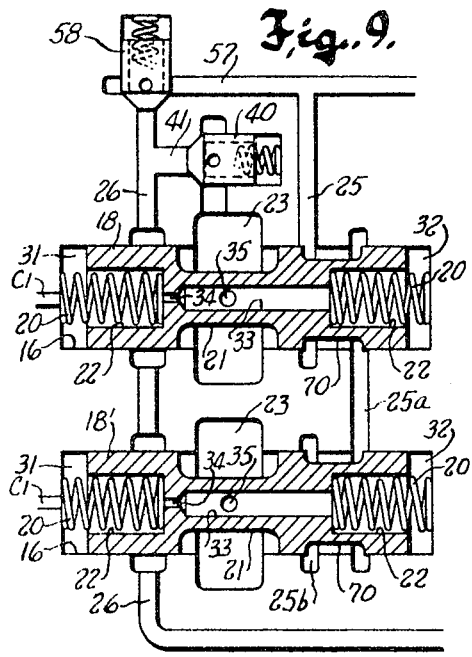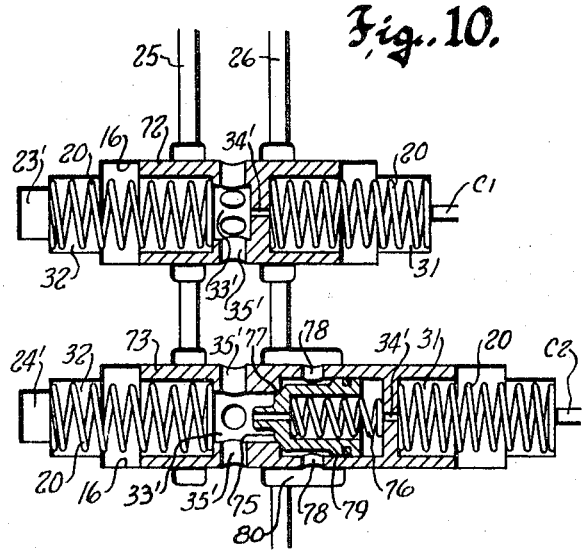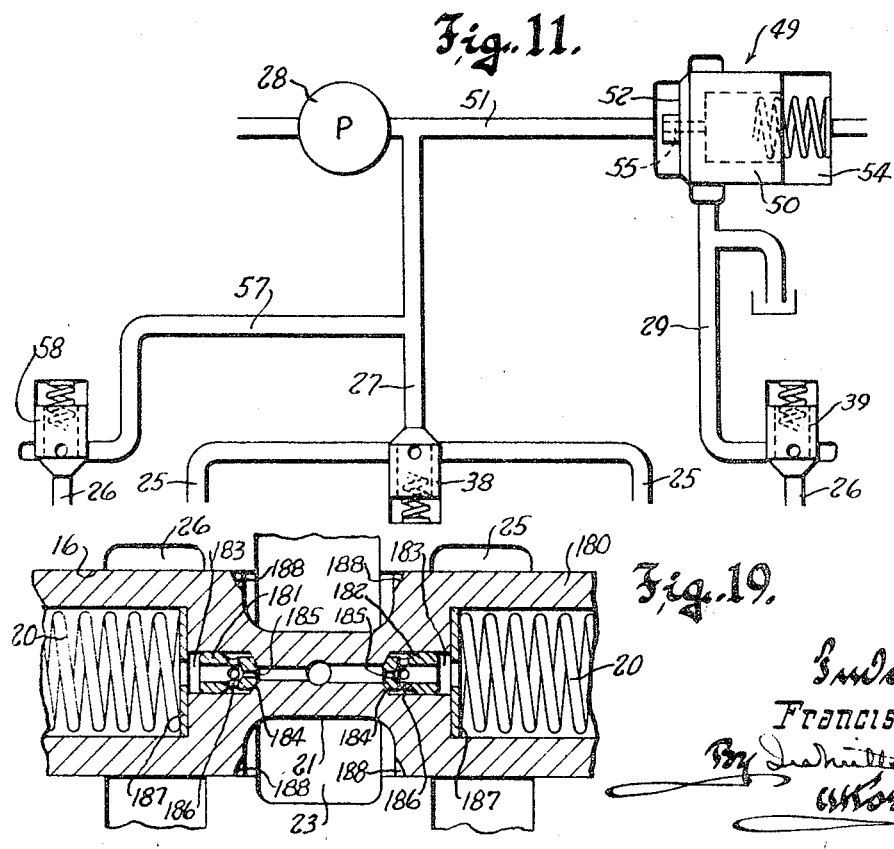

Sept. 2, 1969   F. H. TENNIS   3,464,443
PILOT CONTROLLABLE VALVE MECHANISM
Filed Oct. 19, 1967   10 Sheets-Sheet 5

Inventor
Francis H. Tennis
By
Attorney

Sept. 2, 1969 F. H. TENNIS 3,464,443
PILOT CONTROLLABLE VALVE MECHANISM
Filed Oct. 19, 1967 10 Sheets-Sheet 10

Inventor
Francis H. Tennis
Attorney

United States Patent Office 3,464,443
Patented Sept. 2, 1969

3,464,443
PILOT CONTROLLABLE VALVE MECHANISM
Francis H. Tennis, Oconomowoc, Wis., assignor, by mesne assignments, to Koehring Company, Milwaukee, Wis., a corporation of Wisconsin
Filed Oct. 19, 1967, Ser. No. 676,547
Int. Cl. F16k 11/18, 31/43
U.S. Cl. 137—596.12                                                                 23 Claims

ABSTRACT OF THE DISCLOSURE

Each valve element of a control valve is pressure responsive and governs flow of pressure fluid to and from only one port of a fluid motor. Admittance of pressurized control fluid to a first pressure chamber associated with the vale element effects movement thereof to a feed position, while admittance of return pressure fluid from the controlled motor to a second pressure chamber associated with the valve element effects movement thereof to an exhaust position.

This invention relates to control valve mechanisms for fluid pressure operated systms, and has more particular reference to improvements in axially slidable spool type control valves for governing operation of hydraulic cylinders and other fluid motors.

The primary purpose of the invention is to provide a spool type control valve which features a degree of simplicity and compactness heretofore unattainable with conventional spool valves and which, as a result, can be produced at considerably lower cost.

The spools of control valves for reversible fluid motors were heretofore constructed so that each spool of the valve controlled fluid flow to either port of the fluid motor and at the same time effected venting of the other port of the motor. As a result, the spools and the valve bodies containing them had to be quite lengthy, and the spools were often difficult to shift because of warpage of the valve bodies containing them.

It is an object of this invention, however, to provide what might be generally termed a divided spool type control valve which departs radically from the conventional in that each spool of the valve comprises a pressure actuatable plunger that controls fluid flow to and from only one port of a fluid motor. From this, it will be seen that for conrtol of a reversible fluid motor, a control valve of this invention requires a pair of independent but cooperating substantially short spools, one for each of the two ports of the motor; while one such spool will suffice for control of a single acting motor.

Another purpose of the invention resides in the provision of a control valve having pressure responsive valve spools each of which is held in a neutral position as long as a single pilot control port therefor is blocked, and each of which spools is respectively actuatable to either feed or vent positions depending upon whether pressure fluid is admitted to or exhausted from its control port.

Still another purpose of the invention is to provide a spool type control valve mechanism wherein each spool of the valve can also serve as a load holding check valve, making it possible to eliminate conventional load holding check valves.

Another object of the invention resides in the provision of a spool type control valve of the charatcer described, in which the locations of the land defining grooves relative to the passages communicated thereby, known as "land timing," has none of the criticality of conventional spool type control valves.

A further object of the invention resides in the provision of a divided spool control valve featuring separate control spools for each port of a fluid motor controlled thereby, and which lends itself exceptionally well to either sectional valve construction for control of a plurality of fluid motors, or to unit body construction.

In this respect, it is still another object of the invention to provide a divided spool control valve mechanism for governing a plurality of reversible fluid motors, wherein each motor is controlled by a pair of cooperating spools, and wherein the valve mechanism can be readily adapted for parallel, series parallel or series valve circuitry.

Another purpose of this invention is to provide for speed and directional control of a fluid motor by a divided spool type control valve of the character described, at the dictate of a pilot valve comprising a small conventional spool type control valve and a speed regulating unloading valve controlled by the pilot valve.

In this respect, it is also an important purpose of this invention to provide a control valve having spools that can be made to respond in kind to the commands of a pilot valve having such operating positions as float and high pressure regeneration, in addition to its conventional neutral, raise and lower positions.

With these observations and objects in mind, the manner in which the invention achieves its purpose will be appreciated from the following description and the accompanying drawings.

The accompanying drawings illustrate several complete examples of the physical embodiment of the invention constructed according to the best modes so far devised for the practical application of the principles thereof and in which:

FIGURE 1 is a view partly in section and partly in elevation, of part of a valve bank comprised of valve sections each incorporating divided spool valve elements of this invention;

FIGURE 2 is a cross sectional view taken on the line 2—2 of FIGURE 1;

FIGURE 3 is a face view of one of the control valve sections;

FIGURE 4 is a sectional view of a pilot valve, one of which is required for each spool section, together with speed control means governed by the pilot;

FIGURE 5 is a schematic view illustrating a parallel circuit control valve mechanism for governing operation of a pair of reversible fluid motors;

FIGURES 6, 7 and 8 are fragmentary schematic views illustrating other mechanisms that can be optionally used with the control valve mechanism of FIGURE 5;

FIGURE 9 is a fragmentary schematic view illustrating how the control valve mechanism of FIGURE 1 can be modified for series-parallel operation;

FIGURE 10 is a fragmentary schematic view illustrating modified versions of divided spools such as seen in FIGURE 5;

FIGURE 11 is a fragmentary schematic view illustrating another modification of the mechanism shown in FIGURE 5;

FIGURE 19 illustrates a divided spool valve element equipped with damping devices.

Figure 12:
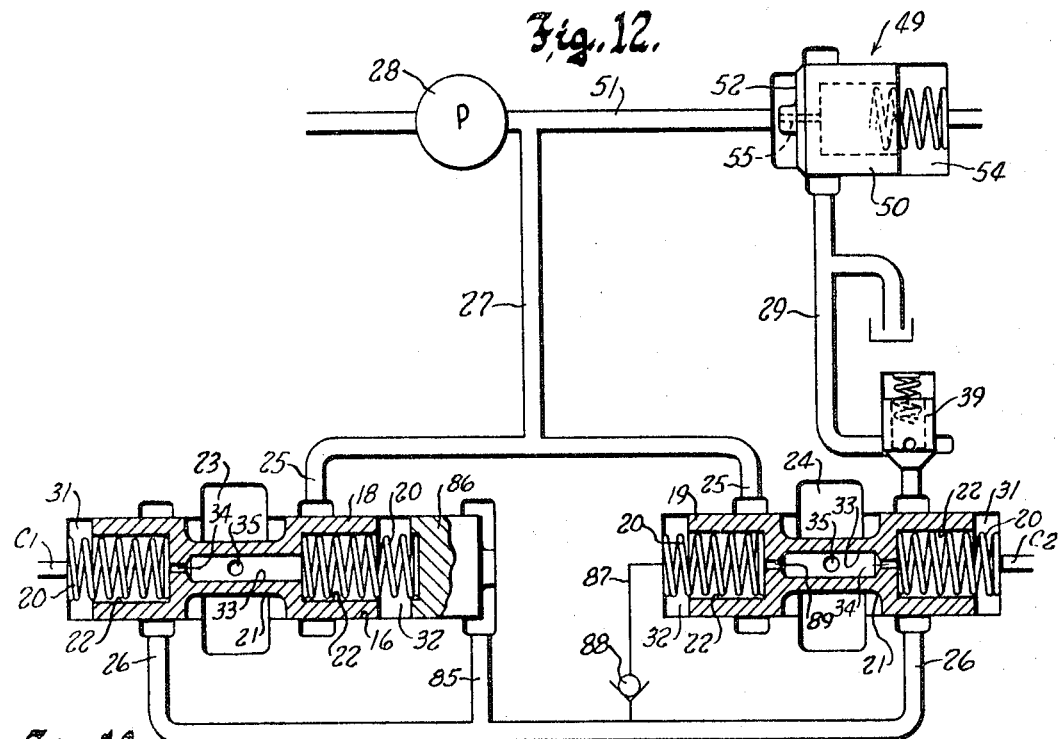
FIGURE 12 is a schematic view similar to FIGURE 5, but showing another modification of the invention.

Referring now to the accompanying drawings, the numeral 9 in FIGURE 1 designates a divided spool control valve mechanism of this invention. The valve mechanism has been shown as comprising a plurality of identical individual valve units or sections 10, 11 and 12, stacked flatwise together and confined between end sections 13 to form a bank. It is to be understood, however, that the divided spool valve mechanism of this invention lends itself equally well to unit body construction, that is where one valve body contains all of the valve spools necessary for controlling a plurality of fluid motors.

Each valve unit comprises a flat substantially rectangular block-like body section 14 having opposite flat faces 15 which are parallel to one another and adapted to have mating and sealing engagement with the flat faces on adjacent body sections. The junctions between adjacent sections can be made in accordance with the teachings of my Patent No. 3,133,559, issued May 19, 1964, in order to prevent leakage of fluid at said junctions. FIGURE 3 illustrates the essence of that leak-proof joint as embodied in one face of each body section 14.

As seen best in FIGURE 2, each body section is provided with a pair of parallel spaced apart bores 16, the axes of which lie in a common plane parallel to and midway between the opposite faces 15 of the section. These bores extend entirely across the body section to be closed at their ends by covers 17 held in place on the opposite sides of the body section as by screws such as shown in FIGURE 1.

Each body section contains a pair of substantially short valve spools, 18 and 19, each axially slidably received in one of the bores 16. Each spool is adapted to control flow of pressure fluid to and from only one port of a fluid motor. Hence, it will be apparent that but one valve spool is needed for control of a single acting cylinder, while two separate but cooperating spools are needed for control of a double acting cylinder or other reversible fluid motor.

Each spool is movable from a neutral position, in which it is normally yieldingly held by centering springs 20, to operating positions at opposite sides of neutral. Each spool also has a medial circumferential groove 21 and cup-like hollow end portions 22 into which its centering springs project.

Service passages 23 and 24, opening laterally from the bores for spools 18 and 19, respectively, are formed as enlargements of the bores medially of their ends. These service passages are at all times in register with the grooves 21 in the spools, and they are connectable with the ports of a reversible fluid motor to be controlled by the spools, as schematically shown in FIGURE 5. Supply and exhaust passages 25 and 26, respectively, each common to both bores 16, open laterally therefrom at opposite sides of the service passage enlargements, at zones opposite the cup-like end portions 22 of the valve spools.

At zones between the bores, the supply and exhaust passages 25 and 26 have portions that open to the opposite faces 15 of each body section, in register with those of an adjacent section, so as to provide carryover passage sections of supply and exhaust headers that extend through all of the body sections. One of the headers, of course, communicates with an inlet 27 in one of the end sections of the bank thereof, and through which inlet it receives supply fluid from the outlet of a pump 28 (FIGURE 5). Similarly, the other header is communicable with a reservoir through a duct 29 (FIGURE 5) that may connect with an outlet in either end section of the bank.

Each valve spool is axially movable from its neutral position shown to first and second operating positions at opposite sides of neutral. In one operating position, the medial groove 21 in the spool communicates its service passage (23 or 24) with the supply passage 25. In its other operating position, the medial groove in the spool communicates its service passage with the exhaust passage 26. Hence, each spool controls fluid flow to and from one motor port connected with its service passage; from which it will be apparent that only one such spool is capable of controlling a single acting motor.

According to this invention, each bore 16 of a body section serves as a cylinder the opposite ends of which provide pressure chambers 31 and 32, and the valve spool therein provides a fluid pressure responsive plunger that is actuated into either pressure chamber of the cylinder, to one of its operating positions, in consequence of establishment of a predominating fluid pressure in the other pressure chamber. To provide for such actuation of the valve spools 18 and 19, their respective pressure chambers 31 which are adjacent to the exhaust passage 26, are provided with pilot control ports C1 and C2; the service passages 23–24 in the body section are at all times substantially unrestrictedly communicated with their respective pressure chambers 32; and the pressure chambers 31 and 32 of each bore are restrictively communicated with one another.

While there are various ways of effecting such communication between the service passages and the pressure chambers of each valve instrumentality, one very simple way is to employ a valve spool which is tubular. Hence, the hollow interior of each tubular valve spool can provide a passage 33 which communicates its pressure chambers 31 and 32 with one another through a restriction 34 in said passage, at the end thereof adjacent to chamber 31. Valve passages 33 also provide substantially unrestricted communication between service passages 23–24 and their respective pressure chambers 32, through radial holes 35 located in the walls of the medially grooved portions of the tubular valve spools and at all times in communication with the service passages associated therewith.

With this construction, it will be seen that if the control port (C1–C2) for either valve spool is closed, pressure fluid will be trapped and balanced in its chambers 31 and 32 and maintained therein at the cylinder pressure obtaining in the associated service passage 23 or 24. The equal pressure forces then acting on the opposite ends of the plunger provided by the valve spool allow the centering springs 20 to hold the spool in its neutral position at which the lands provided by the opposite cup-like end portions of the spool close off its service passage from both its supply and exhaust passages 25–26.

When it is desired to direct supply fluid to a fluid motor, through service passage 23 for instance valve spool 18 is actuated to its first operating position communicating its service passage 23 with supply passage 25. This is accomplished by directing pressurized control fluid from pump 28 through port C1 into the pressure chamber 31 for spool 18. Because of the restriction 34 in the spool 18, a predominating pressure is then established in its chamber 31. Spool 18 responds to this predominating pressure in its chamber 31 and is moved to the right thereby to its first operating position communicating service passage 23 with supply passage 25.

If pressure fluid is allowed to exhaust from the chamber 31 for spool 18 through its control port C1, pressure fluid from service passage 23 can flow into axial passage 33 of the spool through radial port 35 in its wall to establish a predominating pressure in its chamber 32, due to the influence of restriction 34. The spool 18 responds to such predominating pressure in its chamber 32 and is moved to the left thereby, to its second working position venting service passage 23 to the exhaust passage 26. Consequently, return fluid in service passage 23 will flow into the exhaust header for return to the reservoir.

Flow of return fluid from service passage 23 to the exhaust passage 26 can be stopped whenever desired merely by blocking control port C1, whereupon the spool 18 will return to its neutral position in consequence of equalization of pressures in its chambers 31 and 32.

The above statement of operation is typical of the control which spool 18 provides for a single acting motor. When a reversible fluid motor such as a double acting hydraulic cylinder 37 (FIGURE 5) is to be controlled, the second valve spool 19 is cooperable with spool 18 to effect flow of pressure fluid to either port of the cylinder and to concurrently vent the other cylinder port to the reservoir. The operation of a divided spool valve mechanism for thus controlling a double acting cylinder 37 is schematically shown in FIGURE 5, to which specific reference will now be made.

The valve spools 18 and 19 are there schematically shown in axially opposed relation, and as though each were provided with its own supply and exhaust passages. The spools 18 and 19 will be in their neutral positions shown when their respective control ports C1 and C2 are blocked. When pressurized control fluid from pump 28 is admitted to the chamber 31 of valve spool 18 through its control port C1, port C2 for valve spool 19 must be vented. Spool 18 will then be actuated to the right in response to predominating pressure in its chamber 31, to cause supply fluid to flow from passage 25 to service passage 23 and to the lower port M1 of cylinder 37 connecting with said service passage. This causes upward extension of the piston rod of cylinder 37. Pressure fluid expelled from the upper port M2 of the cylinder returns to service passage 24 of spool 19, and flows unrestrictedly through passage 33 thereof into its chamber 32 to produce a predominating pressure therein by which spool 19 is moved to the right to its operating position venting service passage 24 to the exhaust passage 26.

Similarly, if pump fluid is admitted to control port C2 while control port C1 is vented, predominating pressures are established in chambers 32 and 31 of valve spools 18 and 19 respectively, to cause both spools to shift to operating positions at the left of neutral, to connect cylinder port M2 with the supply passage 25 and cylinder port M1 with the exhaust passage 26. This, of course, reverses the direction of operation of cylinder 37.

A second double acting cylinder, not shown, can be controlled by the spools of valve section 12 illustrated in FIGURE 5 in the same way as described above.

One of the outstanding features of the divided spool valve mechanism described, is that each of its spools is capable of serving as its own load drop check valve, For example, assuming the spool 18 to be in its right hand operating position in FIGURE 5, at which pump fluid can flow to service passage 23 and hence to the bottom end of the cylinder 37, spool 18 will immediately move toward neutral to close off its service passages 23 whenever pressure therein rises to a value above the pressure of pump fluid in the supply passage 25. It responds in this manner because of the fact that at such a time the pressure in its chamber 32 will also exceed the pressure of pump fluid in chamber 31 which, of course, will be equal to that of fluid in the supply passage. As soon as passage 23 is closed off, pressures in the chambers 31 and 32 equalize and spool 18 is caused to occupy its neutral position in which it will remain until a difference in pressure is again produced in its chambers.

If desired, however, a normally closed check valve 38 can be used at the inlet 27 of the supply header in the manner indicated in FIGURE 6, to open whenever pressure of fluid at the inlet 27 exceeds the pressure of fluid in either service passage 23 or 24 that may be then communicated therewith. The advantages of such a check valve will be discussed hereinafter.

Another important feature of the valve mechanism is that spools thereof can be produced without critical regard for "land timing." In conventional spool type valves, the lands on the spool are so "timed" with respect to the locations of the supply, exhaust and service passages, as to assure that one end of the governed cylinder will be vented slightly before supply fluid is fed into its other end. Such timing is not essential with the divided spool valves of this invention, wherein each spool is actuated solely in response to differences in pressure in its chambers 31 and 32, and wherein the pressures in said chambers can be influenced by pressure conditions in the service passage associated therewith.

In addition to its above described motor reversing functions, the control valve mechanism 11 comprising valve spools 18 and 19 can also achieve high pressure regenerative operation of the motor 37, as well as float, if desired. High pressure regeneration effects rapid extension of the piston rod of cylinder 37, or high speed raise; while float effects venting of any pressure in the work cylinder and is popularly resorted to for effecting rapid lowering of a load connected to its piston rod.

High pressure regeneration or rapid lift is achieved by admitting pressurized control fluid from pump 28 to the chambers 31 of both valve spools 18 and 19, through their respective pilot ports C1 and C2. As seen best in FIGURE 5, this will cause the spools to move to positions concurrently communicating their service passages 23–24 with the supply passage 25, so as to connect motor ports M1 and M2 with one another through the valve mechanism. Though the same presusre will then obtain in both ends of cylinder 37, its piston will nevertheless be moved upwardly to lift a load carried by its rod, due to the greater area of the piston exposed to the pressure of supply fluid in the lower end of the cylinder. Fluid expelled from the upper motor port M2 returns to service passage 24 and flows to the supply passage 25 then communicated therewith, and such return fluid joins the flow of pump fluid flowing through service passage 23 to motor port M1. Hence, motor port M1 receives supply fluid from the pump together with exhaust fluid from motor port M2, and the piston rod of cylinder 11 will be extended at a substantially rapid rate.

Movement of spool 19 to its high pressure regeneration or rapid lift position described above, however, requires that its chamber 32 be vented to the supply passage 25. This can be readily accomplished in some cases by a check valve controlled duct that either connects the service passage 24 with the supply passage, or as shown in FIGURE 5, by a duct 42 connecting the chamber 32 for spool 19 with the supply passage 25, and containing a check valve 42′.

Float and/or rapid lowering of the load on the cylinder is achieved by venting both control ports C1–C2. This allows both spools 18 and 19 to assume their neutral positions shown, from which either spool can be shifted to an exhaust position in response to expulsion of fluid from its associated cylinder port under load forces acting upon the piston rod of cylinder 37.

For example, if the substantially heavy boom structure of a front end loader or the like comprises the load on the cylinder, it can be lowered rapidly under its own weight by concurrently venting both control ports C1 and C2. When this occurs, pressure fluid expelled from motor port M1 at the bottom of the cylinder flows to service passage 23, and from thence to passage 33 in spool 18, to produce a predominating pressure in the chamber 32 thereof. The spool 18 responds to such predominating pressure in its chamber 32 and is moved to the left thereby to communicate its service passage 23 with the exhaust passage 26.

Normally, fluid thus exhausting from motor port M1 would then flow to the reservoir, as through the duct 29 seen in FIGURE 5. However, a restriction means, here shown by way of example as a spring biased low pressure relief valve 39, is provided in the exhaust header adjacent to its outlet, to cause pressure of return fluid from cylinder port M1 to build up to a value sufficient to unseat a void control check valve 40 governing a bypass 41 between service passage 24 of valve spool 19 and the exhaust passage 26. Consequently exhaust fluid expelled from motor port M1 in the float position of the valve spools is pressurized in the exhaust header and then returned to the expanding upper end of of cylinder 37 through the bypass 41, check valve 40, service passage 24 and motor port M2 connecting therewith.

A similar bypass 41 and check valve 40 governing the same can be provided for valve spool 18, to cause pressurized fluid to flow to the large volume end of cylinder 37 if the latter end expands under the influence of a load connected to the piston rod of the cylinder.

From the above, it will be seen that the low pressure relief valve 39 and check valves 40 provide assurance against drawing voids in either end of the cylinder 37 during float operation of the cylinder as well as during normal operation thereof, as for instance during lowering of a heavy load under power.

A pilot valve P1 such as seen in FIGURE 4, can be employed to govern actuation of valve spools 18 and 19. The pilot valve can be provided by a conventional open center spool type control valve, preferably in one of the smaller sizes thereof. Pump fluid entering its inlet 43 normally flows through an open center passage in the pilot to an outlet header 44 for return to the reservoir. Such flow through the open center passage is blocked when the spool 45 of the pilot is shifted in either direction out of its neutral position shown, to one or the other of a pair of defined operating positions displaced predetermined distances at opposite sides of neutral. As is customary, the spool 45 is thus adapted to communicate either service passage 46 or 47 of the pilot with the inlet and the other service passage with the outlet through one or the other of a pair of exhaust passage branches 48 leading to the outlet header 44.

Pilot service passage 46 can be connected to control port C1 for valve spool 18, while the other pilot service passage 47 can be connected to control port C2 for valve spool 19. Accordingly, shifting of the pilot spool a first distance to the right of neutral not only diverts pump fluid entering its inlet to pilot service passage 46 and hence to control port C1 connected therewith, but it also causes control port C2 to be vented to the reservoir through pilot service passage 47 connected therewith. This results in actuation of spools 18 and 19 to effect extension of the piston rod of cylinder 37 in the manner described previously.

Shifting of the pilot spool a first distance to the left of neutral reverses these connections of pilot service passages 46 and 47 with the pump and reservoir, to effect retraction of the piston rod of control valve 37 in consequence of pressurization of control port C2 concurrently with venting of control port C1.

Obviously, if cylinder 37 were of the single acting type, only one valve spool, such as the spool 18, would be required, and the service passage 47 of the pilot valve would be plugged in the usual manner. In that case, the pilot spool could be a conventional single acting spool with fewer lands.

A fluid pressure operated system incorporating divided spool valves of this invention can also advantageously employ a speed control unit 49, such as seen in FIGURE 4 and in the schematic views. The speed control unit operates in a manner fully described in my reissue Patent No. Re. 26,028 granted May 17, 1966, and it may be considered a metering type bypass valve by which the pump 28 is unloaded at times when the pilot valve and the valve spools 18 and 19 are in their neutral positions. It comprises a pressure responsive valve plunger 50 which is spring biased toward a closed position blocking fluid flow from the pump outlet through a bypass 51 to the reservoir duct 29. It opens in response to pressure of pump output fluid on its front 52, and it moves toward bypass closing position in response to increase in pressure at the inlet 43 of the pilot valve.

The valve plunger 50 is capable of occupying any of a number of positions intermediate its open and closed positions to meter the amount of pump output fluid being bypassed to the reservoir, which intermediate positions it assumes depending upon the extent the pilot spool 45 restricts fluid flow through the open center passage of the pilot. The valve plunger 50, of course, completely closes the bypass 51 whenever the pilot spool closes off flow through the open center passage in the pilot valve.

Such response of the valve plunger 50 to pressure at the pilot inlet is achieved by communicating the latter with the chamber 54 in which the plunger operates; and if desired, the plunger can have a passage 55 through its front leading to chamber 54 to supply the pilot valve with pump fluid therefrom as shown.

As indicated, the pilot spool 45 can be grooved to provide float and high pressure regenerative positions that are effective when the spool is displaced greater distances to opposite sides of neutral. In its float position, the spool of the pilot effects concurrent venting of both of its service passages 46 and 47 to allow the valve spools 18 and 19 to respond freely to load forces on the cylinder 37. In its high pressure regenerative position, the spool of the pilot effects concurrent pressurization of control ports C1 and C2, as described earlier.

As in conventional control valves, the pilot valve is provided with high pressure relief valve mechanism which opens whenever pressure in the system rises to a predetermined relief value. Opening of the relief mechanism, of course, effects venting of either control port C1 or C2 that may have been receiving control fluid from the pilot service passage connecting therewith. If port C1 were thus vented, for example, the valve spool 18 would immediately shift to its exhaust position to vent service passage 23 in response to the over pressure therein and in chamber 32 communicating therewith.

Though each spool of the valve mechanism of this invention can serve as its own check valve, as described earlier, there are times when it can be highly desirable to additionally employ therewith the inlet check valve 38 mentioned before. The check valve 38 can then serve as a fast closing check to supplement the check valve action of the valve spools, since shifting of the latter toward their neutral positions by back pressure in their service passages requires a small but given increment of time.

Also, when a suitably strong biasing spring is provided for check valve 38, the latter can serve as a low pressure relief valve to maintain a pilot pressure greater than the pump pressure in the supply passage 25. This will assure against hunting of either valve spool 18 or 19 under certain conditions.

Check valve 38, if biased closed by a spring of suitable strength, will maintain the desired high pump and pilot pressure regardless of any low pressure condition in the cylinder at the time it is communicated with one or the other of the service passages 23–24 of the valve mechanism.

In some cases, it may be desirable to communicate the supply header with the exhaust header, as by the duct 57 seen in FIGURE 5, and to provide a single void control check valve 58 to govern communication between the headers. In that event, the individual void control check valves 40 could be eliminated in some cases, since the check valve 58 serves a similar purpose by allowing load pressurized exhaust fluid from the cylinder to be returned to the supply header to join the flow of pump fluid flowing to the starving end of the cylinder. FIGURE 11 shows an alternative to the above, where the duct 57 could be communicated with the inlet 27 seen in FIGURE 6, ahead of the inlet check valve 38.

The second pair of valve spools 18 and 19 of valve mechanism 12 shown in FIGURE 5, are connected in parallel with the spools of valve mechanism 11, and are adapted to be governed by a pilot valve which may be identical with the pilot valve for valve mechanism 11, or by one which does not necessarily provide for float or high pressure regeneration.

Suggestive of the versatility of the valve mechanism of this invention is the fact that any two valve spools shown in FIGURE 5, or in a bank of such spools, can have their service passages communicated with the ports of a double acting cylinder to control the same, provided the control ports of the selected valve spools are properly connected with the service passages of the same pilot valve. This versatility of the valve mechanism can often facilitate and simplify the control and service connections in many fluid pressure operated systems.

The valve spools of each of the valve mechanisms illustrated in FIGURE 5 will faithfully obey the commands of their respective pilot valves even to the extent that the lands on the pilot spool are "timed" to vent one of its service passages to the exhaust passage slightly before it opens its other service passage to the pilot inlet. Thus, for example, when the spool of the pilot valve for valve unit 11 is moved to its operating position effecting retraction of the piston rod of cylinder 37, it first vents the pilot service passage connected with control port C1 so that valve spool 18 immediately moves to its exhaust position. Substantially directly thereafter, the pilot spool effects delivery of control fluid to control port C2 of spool 19 to cause the latter to shift to its feed position at which supply fluid from the pump flows to the upper end of the cylinder.

An exception to the above would be where the pressure in the upper end of cylinder 37 was substantially low at the time spool 18 was actuated to feed supply fluid to the bottom end of the cylinder. Spool 19 would not then immediately respond to the command of the pilot valve, but would shift to its exhaust position only after pressure in the top of the cylinder increased to the value necessary to establish a predominating pressure in chamber 32 for spool 19. Hence, under these conditions, the spools 18 and 19 more or less serve a counterbalancing function.

Any delay in the supply of pump fluid to one end of a cylinder resulting from the land timing of the pilot spool could lead to the formation of a void in that end of the cylinder, especially if its piston rod were connected to a substantially heavy load tending to expand said end of the cylinder. The boom structure of an end loader or the like represents such a heavy load which could descend a considerable distance by gravity before any pump fluid could be supplied to the expanding end of the cylinder, and a void would be produced therein.

To lower such a heavy load, for example, the pilot spool land timing would cause spool 18 to shift to its position venting the large diameter head end of cylinder 37 slightly before spool 19 would be caused to shift to its feed position directing pump fluid to the smaller rod end of the cylinder. At such times, the pressure of fluid rapidly expelled from the head end of the cylinder will rise substantially instantaneously in the exhaust header 26 and unseat the feedback check valve 40 for service passage 24, to allow load pressurized fluid in the exhaust header to flow to the expanding upper end of the cylinder in bypass relation to spool 19. Accordingly, there will be no possibility of drawing a void in the upper end of the cylinder before spool 19 is actuated to its feed position by the pilot valve.

This same objective can be achieved without reliance upon the large feedback check valve 40 for service passage 24, by the expedient illustrated in FIGURE 7, and which involves shifting of spool 19 to its feed position in response to load pressurized fluid in the exhaust header. In this case, load pressurized fluid from the exhaust header is fed into chamber 31 for spool 19 through a duct 62, past a small check valve 63 therein to cause the spool to shift to its position communicating its service passage 24 with the supply header 25. Consequently load pressurized fluid in the exhaust header can then flow past check valve 58 to the supply header 25 and to the rod end of the cylinder via service passage 24.

If desired, a similar duct 62 and check valve 63 can also be used with spool 18, in place of the feedback check valve 40 provided therefor, to feed load pressurized fluid from the exhaust header into chamber 31 for spool 18 at times when the load tends to extend the piston rod of the cylinder.

A more serious problem exists if the load tends to extend the piston rod of cylinder 37 at the time the pilot valve is actuated to effect such extension of the piston rod. Then, the larger volume head end of the cylinder becomes its expanding end, and it is impossible to fill the same with load pressurized fluid from the contracting smaller volume rod end of the cylinder. To minimize and even preclude void formation in the head end of the cylinder in this case, when spool 19 is shifted to vent the rod end of the cylinder before spool 18 is shifted to its feed position, this invention provides an expedient which takes advantage of the restriction means 39 at the outlet of the exhaust header, for directing load pressurized fluid together with pump fluid to the expanding large volume end of the cylinder.

Such load pressurized fluid can be cause to flow into chamber 31 for spool 18 as through a duct 62 containing a small check valve 63 such as seen in FIGURE 7, to effect shifting of spool 18 to its feed position before it is commanded to do so by the pilot spool. Hence pump fluid will also flow from supply passage 25 to the expanding head end of the cylinder, through service passage 23, together with load pressurized fluid flowing to service passage 23 from the duct 57.

However, there might be conditions under which low pressure in the head end of cylinder 37 at the time spool 18 is thus shifted to its feed position will cause a corresponding drop in pressure in the supply passage 25 and at the pump outlet. This would ordinarily result in a corresponding drop in pressure in chamber 54 of the unloading valve 49 and unseating of its plunger 50 to allow pump output fluid to bypass to the reservoir.

Such opening of the unloading valve can be prevented to accordingly preclude loss of pump output pressure by the expedient illustrated in FIGURE 8, wherein a duct 66 is connected between the exhaust header 26 and the chamber 54 of the unloading valve, and a small check valve 67 in said duct allows load pressurized exhaust fluid from the cylinder to flow to chamber 54 to hold the unloading valve closed. Fluid under pressure from the pump will then be compelled to flow to the expanding head end of the cylinder together with exhaust fluid from the rod end of the cylinder to positivaly prevent a void from forming in the cylinder.

FIGURE 9 schematically illustrates how the valve mechanism of this invention can be easily modified for series parallel operation, although series parallel connected pilot valves will also produce series parallel operation of the parallel connected valve mechanisms 11 and 12 seen in FIGURE 5. The two spools 18 and 18' shown in FIGURE 9 can control single acting cylinders, not shown, or they can have companion spools as before, if they are to control double acting cylinders.

In either event, the supply passage 25 will then comprise upstream and downstream branches for each spool, intersecting their bores at axially spaced locations and normally communicating with one another through circumferential grooves 70 in the valve spools when the latter are in their neutral positions. Hence, movement of any spool from its neutral position to either operating position thereof effects closure of the supply passage by the spool lands on either side of its groove 70, to thereby close off the supply of pump fluid to any spool or spools downstream from the actuated spool.

For example, the downstream branch 25a of the supply passage for spool 18 serves as the upstream supply passage branch for spool 18', and its downstream branch 25b can be dead ended at the bore for the latter spool or it can be extended to become an upstream supply branch for still another spool.

FIGURE 10 schematically shows a valve mechanism comprising two valve spools 72 and 73 which are constructed somewhat differently than the spools 18 and 19, but which will function in the same way to control either one double acting cylinder or two single acting cylinders. Control ports C1 and C2 are similarly provided for the spools 72 and 73, respectively, when they are intended to control a double acting cylinder at the dictate of the same pilot valve. While their supply and exhaust passages 25 and 26, respectively, remain substantially the same as before, their respective service passages 23' and 24' are located at one end of the spool bores 16, in direct communication with their chambers 32.

The spool 72, though tubular, is even shorter than the spools 18, 19 described previously. It differs therefrom primarily in that it has a uniform diameter and a series of radial holes 35' in its wall at a location medially of its ends. The holes 35' open inwardly to the axial passage 33' in the interior of the spool, and they are disposed midway between the supply and exhaust passages 25 and 26 in the neutral position of the spool shown. Hence, spool 72 can be caused to move to the left in response to pressure of control fluid admitted to its chamber 31 through port C1, to a feed position at which its holes 35' communicate the supply passage 25 with the service passage 23'. The restriction 34' again produces the predominating pressure in chamber 31 by which the spool is shifted to its feed position when its control port C1 is pressurized. The spool 72, of course, moves to its vent position at which its holes 35' communicate service passage 23' with the exhaust passage 26 when the control port C1 is vented. It does so in response to predominating pressure in its chamber 32, which will reflect the pressure at the motor port connected with service passage 23'. When the control port C1 is blocked, the fluid pressures in chambers 31 and 32 become equal, and the centering springs act on the spool to yieldingly hold it in its neutral position.

Spool 73 is ideally suited for the control of fluid flow to and from that end of a double acting cylinder in which cavitation is likely to occur. It is generally like the spool 72, but is made sufficiently longer so as to be able to accommodate a void control check valve 75 in its interior, at a location axially between the series of radial holes 35' and the restriction 34'. The check valve 75 is tubular, and it is yieldingly biased by a spring 76 toward a closed position engaging a seat 77 in the interior of the spool. The seat 77 faces axially away from the radial holes 35' and is disposed between them and a second series of radial holes 78 in the wall of the tubular spool 73. The last mentioned holes open to a space around the exterior of the check valve 75 at a location between the seat 77 and an external shoulder 79 on the valve slidably and sealingly engaged with the inner wall of the tubular spool.

The exhaust passage 26 is widened as at 80 at its junction with the bore for spool 73, so as to assure that the holes 78 will register therewith in at least the neutral and feed positions of the spool. Consequently, if pressure of fluid in the service passage 24' drops to a low enough value indicating that there is danger of a void forming in the end of the cylinder connected therewith, load pressurized fluid will be present in the exhaust passage 26 and it can act upon the external shoulder 79 of valve 75 to cause it to open and thereby allow such load pressurized fluid to flow to the service passage through the axial passage 33' in the spool 73, for void relief.

During operation of a divided spool valve mechanism of this invention, there can be times when it is desirable to communicate the service and exhaust passages for flow of return fluid from the end of a cylinder governed by one valve spool to the end of the cylinder governed by the other valve spool. FIGURE 12 schematically illustrates ways that this objective can be achieved.

The valve mechanism therein seen comprises a pair of valve spools 18 and 19 like those shown in FIGURE 5, but wherein the chamber 32 for valve spool 18 is extended axially to intersect a branch 85 of the exhaust header 26. A piston 86 in that chamber is normally held by the centering spring 20 therein, in a defined inoperative position spaced from spool 18, as shown, but the piston is movable in response to load pressurized return fluid in the exhaust header toward the adjacent end of the spool. Hence, the piston can drive the valve spool 18 to its vent position connecting its service passage 23 with the exhaust passage 26 at times when high pressure obtains in the exhaust header.

Instead of the piston actuator 86 described above, a more or less equivalent but simpler expedient is also shown in FIGURE 12 for effecting movement of one of the spools, for example the spool 19, to its exhaust position in response to elevated pressure in the exhaust header 26. This involves communicating the chamber 32 of valve spool 19 with the exhaust header through a duct 87 containing a small check valve 88. The check valve 88, of course, opens in the direction to pass fluid from the header to the chamber 32. In order for this expedient to satisfactorily effect shifting of the spool 19, however, the duct 87 and the seat for check valve 88 should have an effective area greater than that of the radial hole 35 in the wall of the spool 19, or greater than the combined areas of the holes 35 if more than one are provided. Alternatively, a second orifice 89 can be provided in spool 19, at the end of its pasage 33 remote from the restriction 34, and preferably slightly larger in diameter than the latter.

Figure 13:
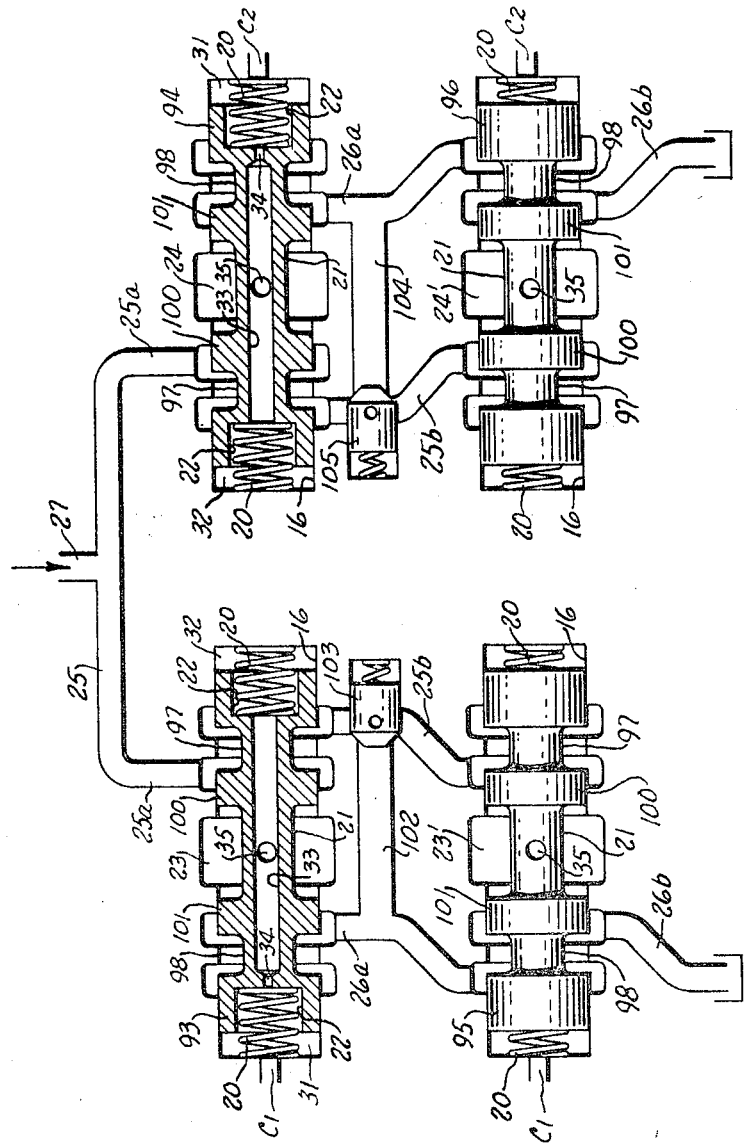
FIGURE 13 is a schematic view of series circuit control valve mechanism embodying this invention, showing the valve spools in their neutral positions.

A series version of the divided spool valve mechanism of this invention is schematically shown in FIGURE 13, where a first pair of valve spools 93 and 94 can control one double acting cylinder, and a second pair of valve spools 95 and 96 can control a second double acting cylinder. All of these spools are like the spools 18 and 19 first described, except that each is provided with a pair of circumferential grooves 97 and 98 at opposite sides of and spaced from its central groove 21.

As in the series parallel valve arrangement described earlier, the service passages 23–24 of the upstream spools 93–94 are adapted to be selectively supplied with pump fluid from an upstream branch 25a of the supply header 25, while the service passages 23'–24' of the downstream spools 95–96 are adapted to be selectively supplied with pump fluid from a downstream branch 25b of the supply passage provided the associated upstream spool is in its neutral position at which its groove 97 communicates the upstream and downstream branches 25a and 25b of the supply passage through the bore containing said upstream spool.

In the neutral positions of the upstream spools 93 and 94, the lands 100 on the spools intermediate their respective grooves 21 and 97 close off their service passages 23 and 24 from the upstream supply branches 25a, while the latter are communicated with the downstream supply branches 25b through the spool grooves 97.

In similar fashion, the service passages 23–24 of the upstream spools 93–94 are adapted to be selectively communicated with first branches 26a of the exhaust passage. Those service passages are normally closed off from the exhaust passage branches 26a by the lands 101 on the upstream spools, located between their respective grooves 21 and 98.

The service passages 23' and 24' of the downstream spools 95 and 96, however, are adapted to be communicated with second branches 26b of the exhaust passage through spool grooves 98 but are normally closed off from branches 26b by the spool lands 101. The exhaust passage branches 26b, of course, lead to the reservoir as indicated.

For purposes of illustration, the branch passages 25b and 26a joining with the bores of spools 93 and 95 have been shown as being communicable with one another by means of a passage 102, through a check valve 103 which normally prevents fluid in supply branch 25b from flowing to the exhaust branch 26a. Similarly, a passage 104 provides communication between the passages 25b and 26a joining with the bores of spools 94 and 96. Again, a check valve 105 normally prevents flow of supply fluid from supply branch 25b to exhaust branch 26a.

It will be appreciated that one check valve can serve the same purpose as the two check valves 103 and 105 in an actual series valve construction. In that case, the check valve would be located in a passageway connecting between a first passage bridging the two supply branches 25b and a second passage bridging the two exhaust branches 26a.

Figure 14:
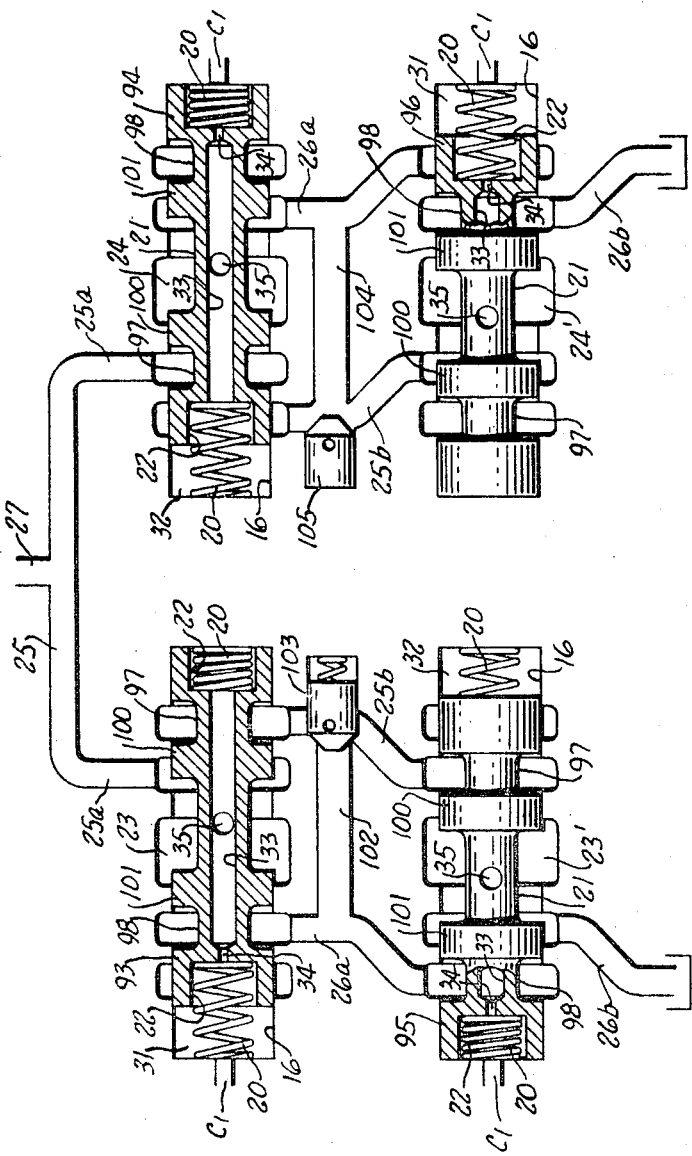
FIGURE 14 is a schematic view similar to FIGURE 13, but showing the valve spools in operating positions.

The operation of the series valve illustrated in FIGURES 13 and 14 is controlled by a pair of pilot valves such as seen in FIGURE 4, one pivot valve for the upstream spools 93 and 94, and a second pilot valve for the downstream spools 95 and 96. The actuation of each pair of spools independently of the other pair of spools is exactly the same as described hereinbefore.

The cylinders governed by both pairs of spools can be operated concurrently, for example when the valve spools are actuated to place them in operative positions such as seen in FIGURE 14. As therein seen, the upstream pool 93 is in its cylinder feeding position as a result of pressurization of its chamber 31, while its companion spool 94 is in its cylinder venting position as a result of venting of its chamber 31. In those operating positions, spools 93 and 94 block flow of pump fluid to the downstream branches 25b of the supply header 25.

FIGURE 14 also shows the downstream spool 96 in its cylinder feeding position as a result of pressurization of its chamber 31, and its companion spool 95 in its cylinder venting position resulting from venting of its chamber 31.

With the four spools in their operating positions shown in FIGURE 14, pump fluid in the supply header can flow to service passage 23 of spool 93, for delivery to one end of a first double acting cylinder connected with passage 23. Fluid exhausting from the other end of the cylinder is returned to service passage 24 for flow to exhaust branch 26a then communicating therewith. Since such exhaust fluid cannot then flow past spool 96 to the reservoir, it is compelled to flow through passage 104 and past the check valve therein to the downstream supply branch 25b then in communication with the service passage 24' governed by spool 96. Accordingly fluid exhausting from the first cylinder governed by spools 93 and 94 can flow to one end of a second double acting cylinder connected with passage 24'. Fluid exhausting from the other end of the second cylinder is returned to service passage 23' of spool 95, for flow to the reservoir via exhaust branch 26b.

Operation of the cylinders controlled by the two pairs of spools can be reversed merely by actuation of their respective pilot valves to concurrently pressurize the chambers 31 of valve spools 94 and 95 while at the same time venting the corresponding chambers of spools 94 and 96.

It is believed to be apparent that many of the options described previously can be incorporated in the series valve of FIGURES 13 and 14 in an obvious manner.

Figure 15:
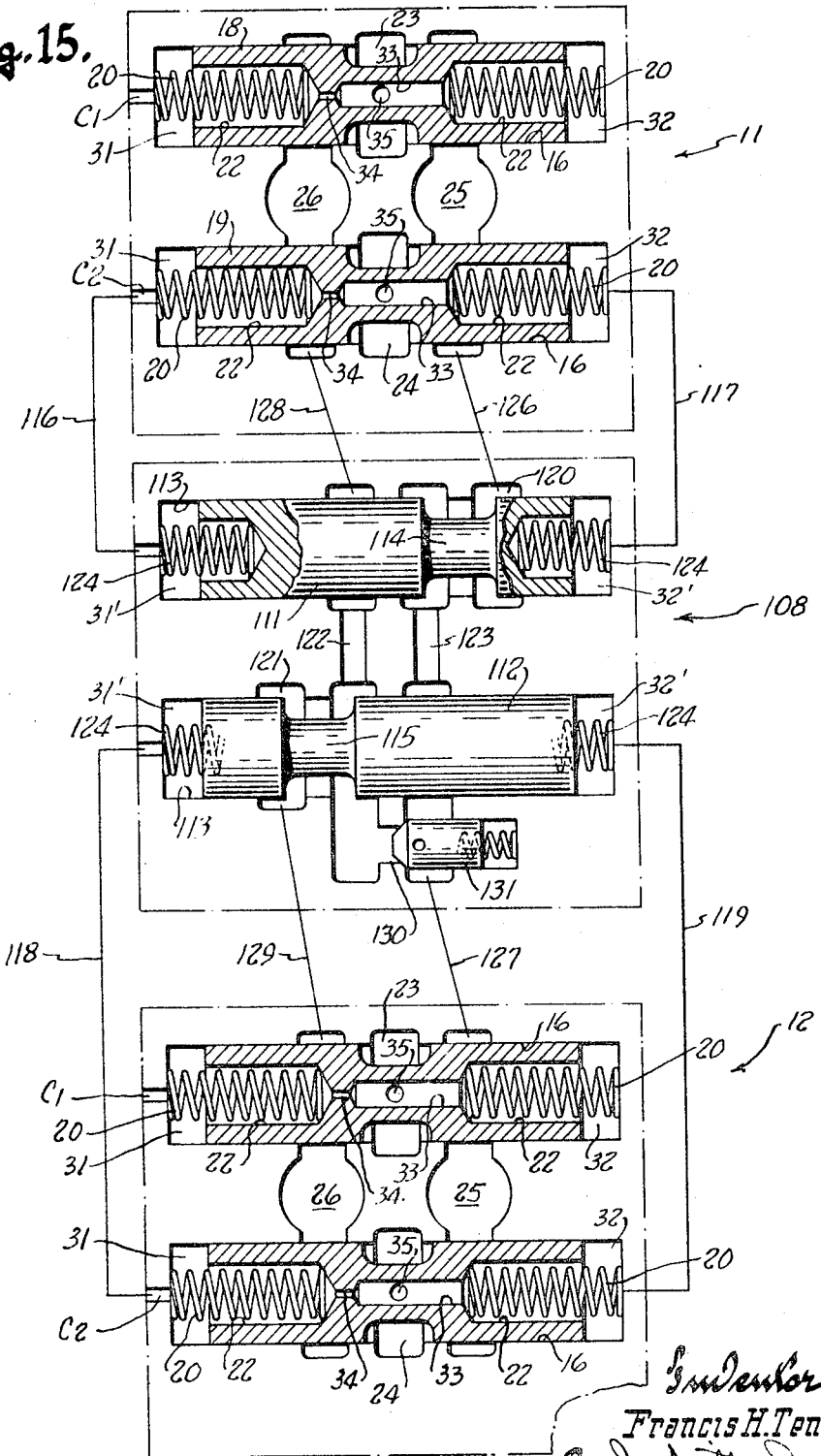
FIGURES 15 and 16 are schematic views illustrating different ways that control valve sections such as seen in FIGURES 1 and 2 can be readily converted for series circuit operation.

FIGURE 15 discloses how a diverting valve section 108 can be employed with a pair of identical valve sections or units 11 and 12 such as first described to achieve series operation of double acting cylinders governed by said valve units.

The series diverter 108, as indicated, can comprise a flat block-like body section secured flatwise between the two valve units 11 and 12. It contains a pair of solid pressure responsive plunger-like valve spools 111 and 112 slidable axially in separate bores 113 which are closed at their ends to define pressure chambers 31' and 32' at the opposite ends of each diverting spool. Spool 111 has an external circumferential groove 114 therein near its right-hand end, while spool 112 has a similar external groove 115 therein near the left-hand end of the spool.

The pressure chambers 31 and 32 for spool 19 in valve unit 11 are respectively connected with chambers 31' and 32' for diverting spool 111, by passages here shown as ducts 116 and 117. Similarly, the pressure chambers 31 and 32 of spool 19 in valve unit 12 are respectively connected with chambers 31' and 32' for diverting spool 112 by passages here shown as ducts 118 and 119.

The diverting valve section 108 has a supply fluid inlet 120 that communicates with the bore containing spool 111 near the right-hand end of the latter, and an exhaust fluid outlet 121 that communicates with the bore containing spool 112, near the left-hand end of that spool. A pair of bridging passages 122 and 123 communicate the bores containing spools 111 and 112, at axially spaced locations between the inlet 120 and outlet 121.

Centering springs 124 normally hold the two diverting spools 111 and 112 in neutral positions shown, at which the bridge passage 123 is communicated with the inlet 120 through the groove 114 in spool 111, and bridge passage 122 is communicated with the outlet 121 through the groove 115 in spool 112.

The supply passages 25 of valve units 11 and 12 are respectively communicated with the inlet 120 and bridge passage 123 in the diverting section, as by carryover ducts 126 and 127. Similarly, the exhaust passages 26 of valve units 11 and 12 are respectively communicated with the bridge passage 122 and the outlet 121 of the diverting section as by carryover ducts 128 and 129.

A crossover passage 130 in the diverting section 108 is provided to communicate the two bridge passages 122 annd 123 thereof, and a check valve 131 in the crossover passage prevents flow of fluid from bridge 123 to bridge 122.

In the operation of the series converted valve units of FIGURE 15, it will be seen that each valve unit 11 or 12 can function individually as hereinbefore described, to direct pump fluid to either end of a double acting cylinder while venting the other end of the cylinder, at the dictate of its pilot valve. Regardless of the direction in which the spools 18 and 19 of the upstream valve unit 11 are caused to shift for operation of the cylinder controlled thereby, the spool 111 of the diverting section 108 will always shift in the same direction as the spool 19 in the upstream valve unit because of the interconnection (116–117) of the pressure chambers of said spools. When shifted in either direction, spool 111 closes off communication beween the inlet 120 and the supply bridge 123 in the diverting section 108.

For example, if the pilot for the upstream valve unit 11 is actuated to vent chamber 31 for spool 18 and to admit pilot fluid to chamber 31 for spool 19, such pilot fluid also flows to chamber 31' for diverting spool 111. Accordingly, both of said spools 19 and 111 will be moved to their right-hand operating positions, at which the diverting spool 111 disrupts communication between its inlet 120 and bridge passage 123. Supply fluid will then flow out of service passage 24 for spool 19 to one end of a double acting cylinder and return to service passage 23 for spool 18, from the other end of the cylinder, for flow to the reservoir through exhaust passage 26, and carryover ducts 128 and 129.

If either spool of the downstream valve unit 12 is then also actuated to a feed position by its pilot, it will direct to its service passage fluid exhausting from the first cylinder for operation of the second cylinder governed by the spools of valve unit 12. Such exhaust fluid flows to the second cylinder through exhaust passage 26, crossover passage 130, carryover duct 127, and whichever service passage is then in communication with duct 127. Shifting of either spool in the downstream valve unit 12, of course, will cause diverting spool 112 to shift in the same direction as the spool 19 in unit 12, due to the interconnection (118–119) between the pressure chambers for said last mentioned spools. Spool 112 closes off communication between its outlet 121 and exhaust bridge 122 regardless of the direction the spool is shifted.

Figure 16:
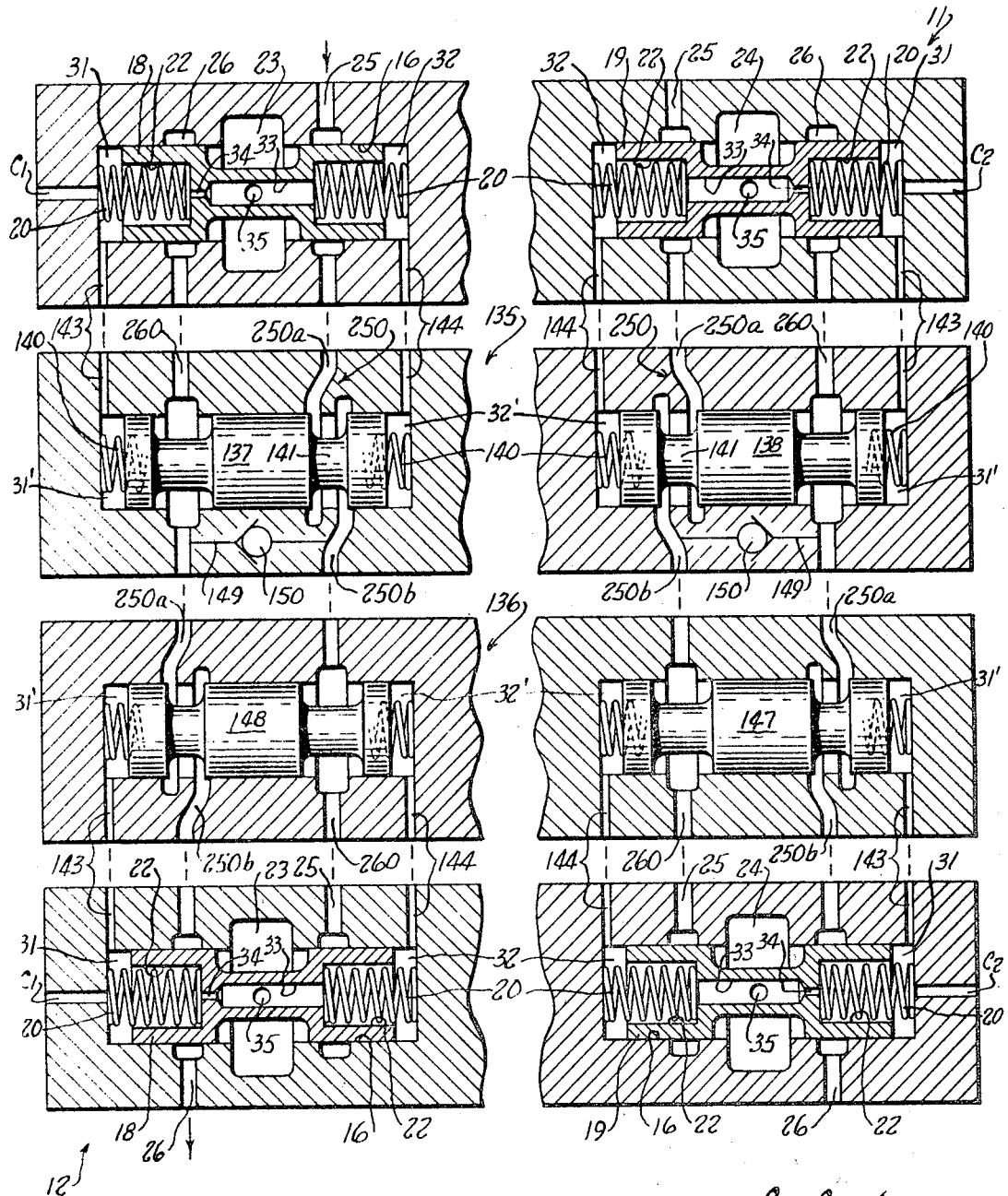

FIGURE 16 more or less schematically illustrates another way of converting a pair of basic upstream and downstream valve units 11 and 12, respectively, by confinement between them of a superimposed pair of upstream and downstream diverting sections 135 and 136, respectively. As in FIGURE 5, each of the valve units 11 and 12 has been schematically shown with its spools 18 and 19 in axially opposed mirror image relation, and as though there were separate supply and exhaust passages 25 and 26 for each spool to be selectively connectable with the service passage thereof.

The diverting section 135 contains a pair of axially slidable pressure responsive solid spools 137 and 138, along with supply and exhaust passages 250 and 260, respectively, which crosswise intersect the bores containing the spools. The passage arrangement and the spools 137 and 138 governing those passages are also shown for convenience as mirror images of one another. While the exhaust passages 260 extend straight down through the diverting section 135 in register with the exhaust passages 26 in the upstream valve section 11, the supply passages 250 comprise upstream branches 250a which open upwardly in register with the supply passages 25 in the upstream valve section 11, and offset downstream branches 250b which communicate with the upstream supply branches 250a when the diverting spools 137–138 are in their neutral positions shown.

The bores in which the diverting spools operate are closed at their ends so that each provides pressure chambers 31' and 32' directly beneath the chambers 31 and 32 for the valve spools 18 and 19 in the upstream valve section 11. Each of the diverting spools is movable into one of its chambers 31'–32' in response to predominating pressure in the other chamber. In addition, each diverting spool is normally yieldingly held by centering springs 140 in its neutral position.

In the neutral position of each diverting spool 137–138, its upstream and downstream supply branches 250a and 250b are communicated through a circumferential groove 141 in the spool. The grooves 141 are narrow enough to assure that said supply branches will be closed off from one another when the spools are shifted in either direction out of neutral. For the sake of clarity, each diverting spool is also shown provided with a substantially wide circumferential groove through which return fluid in its exhaust passage 260 can flow in any position of the spool.

Each of the diverting spools 137–138 is caused to move in unison with and in the same direction as its companion valve spool 18 or 19 thereabove. For this purpose, the pressure chambers 31' and 32' for each diverting spool are respectively communicated by control ducts 143 and 144 with the pressure chambers 31 and 32 for their companion valve spools 18–19. This is the equivalent of providing second control ports C1 and C2 for chambers 31' of the diverting spools 137 and 138, respectively. Accordingly, pressurized control fluid from the pilot valve for the upstream valve section 11 can be directed into control port C1, for example, to chamber 31 for spool 18, and such control fluid will also flow into chamber 31' for diverting spool 137 to cause both spools 18 and 137 to move to operating positions to the right of neutral.

As explained hereinbefore, supply fluid can then flow out service passage 23 in valve unit 11 to one end of a first double acting cylinder, and exhaust fluid from the other end of the cylinder will return to service passage 24 to effect shifting of valve spool 19 to the right to its exhaust position, in response to predominating pressure in its chamber 32. Since said chamber 32 is connected with chamber 32' for diverting spool 138, the latter spool will also be moved to the right, and both spools 137 and 138 will then be in operating positions blocking communication between the branches 250a and 250b of their respective supply passages.

Return fluid from service passage 24 in the upstream valve unit 11 will then flow to the exhaust passage 26 and through the registering passage 260 associated with diverting spool 138 to the downstream diverting section 136. The spools 147–148 and the passage arrangements in the downstream diverting section 136 are the reverse of those in the upstream diverting section 135. This is to say that diagonally opposite spools 137–147 and 138–148 will be identical, as will be the passages governed by said diagonally opposite spools. The only difference between the two diverting sections is that crossover passages 149 in the upstream section 135, provide for flow of return fluid in either exhaust passage 260 to its associated downstream supply branch 250b. Check valves 150 in these crossover passages prevent flow of fluid from the supply passage branches 250b to the exhaust passages 260.

The chambers 31' and 32' for valve spools 148 and 147 are in this case respectively communicated by control ducts 143 and 144 with the pressure chambers 31 and 32 for valve spools 18 and 19 in the downstream valve section 12. Accordingly, each diverting spool 148 or 147 is constrained to move in unison with and in the same direction as the valve spool 18 or 19, therebeneath in valve section 12.

As described above, when diverting spools 137 and 138 have been shifted to the right in consequence of pressurization of chamber 31' for spool 137 and venting of chamber 31' for spool 138, exhaust fluid flows down through passage 260 for spool 138 in the upstream diverting section 135. Such exhaust fluid enters the registering supply branch 250a for spool 147 of the downstream diverting section, and will be returned to the reservoir providing diverting spool 147 and spool 19 in the downstream valve section 12 remain in their neutral position shown.

If, for example, the downstream valve spool 19 has been shifted to the left to its feed position in consequence of admittance of pilot fluid into its chamber 31, the diverting spool 147 thereabove will also be shifted to the left to prevent exhaust fluid in its upstream supply branch 250a from flowing to the downstream branch 250b thereof. This causes such exhaust fluid to be diverted through the crossover passage 149 for spool 138 to its downstream supply branch 250b, from whence it can flow through the registering exhaust passage 260 for diverting spool 147 and supply passage 25 for downstream valve spool 19 to the service passage 24 associated with the latter.

One end of a second cylinder governed by the downstream valve section 12 is thus supplied with fluid exhausting from a first motor governed by the upstream valve section 11. Fluid exhausting from the second cylinder is returned to the service passage 23 for spool 18 of the downstream valve unit to cause the latter to shift to its vent position communicating service passage 23 with the reservoir through exhaust passage 26.

It will be apparent that in an actual sectional valve mechanism such as schematically shown in FIGURE 16, the supply and exhaust passages will be so arranged that only one crossover passage 149 and check valve 150 need be provided for each upstream diverting section 135, to provide for flow of return fluid from either service passage 23–24 in the upstream valve unit 11 to either service passage 23–24 in the downstream valve unit 12 through the downstream diverting section 136. In fact, the check valve 150 and the crossover passage in which it is disposed could be embodied in a separate small body section confined between the diverting sections 135 and 136, in a manner believed to be obvious.

From the above, it will also be seen that series operation of more than one pair of upstream and downstream valve sections can be achieved, using a pair of upstream and downstream diverting sections 135 and 136 between each pair of valve sections in the manner seen in FIGURE 16.

Figure 18:
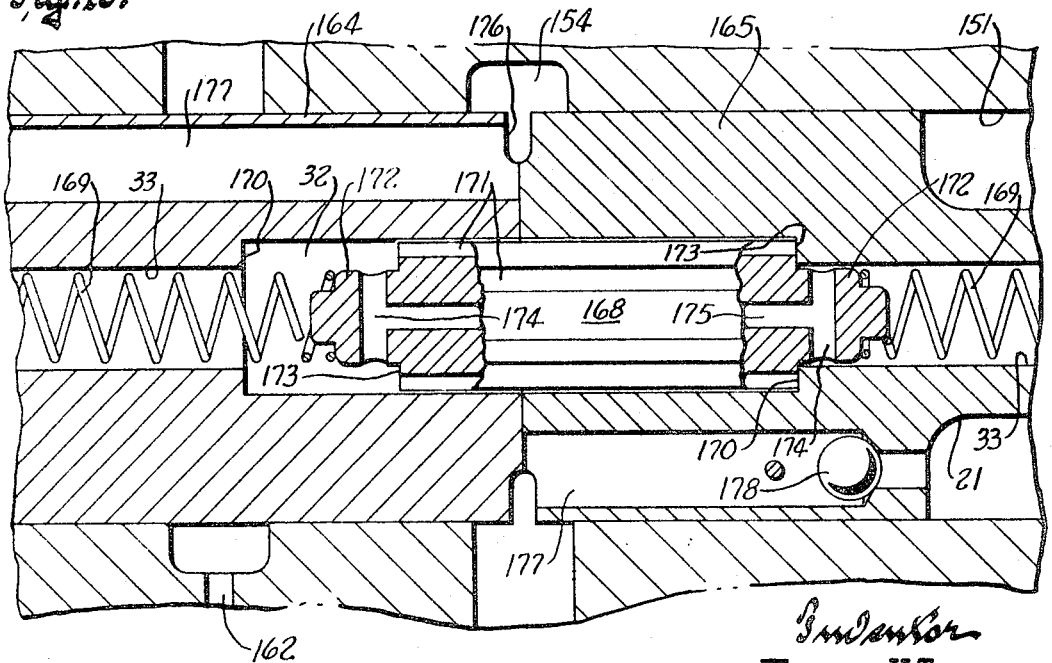
FIGURE 18 is an enlarged detail view of a portion of the valve mechanism seen in FIGURE 17, illustrating the shuttle valve incorporated therein.
Figure 17:
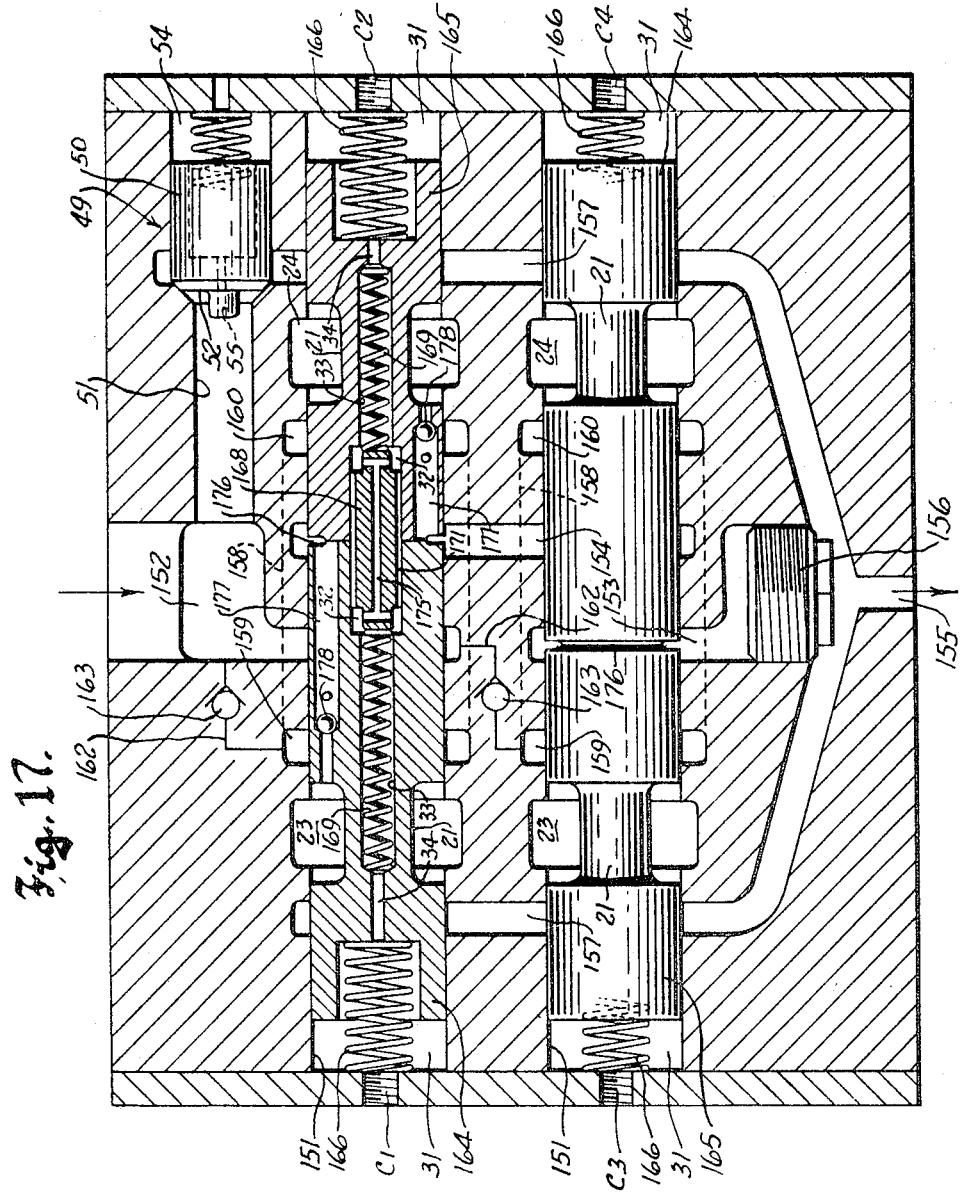
FIGURE 17 is a diagrammatic view illustrating how divided valve spools of this invention can be substituted for conventional spools with little or no alteration in the body for a conventional spool valve.

FIGURES 17 and 18 more or less diagrammatically illustrates how divided spool valve elements of this invention can be incorporated in the body of a conventional control valve to perform the same functions as the substantially long spool type valve elements customarily employed therein. The body has a conventional arrangement of open center, supply and exhaust passages similar to those provided in the pilot valve illustrated in FIGURE 4, but reference may be had to my Patent No. 2,873,762 for a complete disclosure of a control valve more readily identifiable with that shown in FIGURE 17.

The control valve therein seen has two parallel bores 151, and it is of the open center type having an inlet passage 152 intersecting the upper bore, an outlet passage 153 intersecting the lower bore and a carryover passage 154 intersecting both bores but offset from the passages 152 and 153 along the axes of the bores. Passage 154 ordinarily communicates the inlet and outlet passages 152–153 with one another, through the bores 151, when the conventional spools therein are in their neutral positions. Outlet passage 153 ordinarily leads to a reservoir port or outlet 155, but is here shown closed off from the outlet by a plug 156.

Service passages 23 and 24 communicate with each bore at zones spaced to opposite sides of the open center passage. The opposite branches 157 of a U-shaped exhaust passage extend upwardly to intersect both bores 151 at zones axially outwardly of the service passages 23–24. The bight portion of the exhaust passage, of course, communicates with the outlet 155.

The service passages 23–24 associated with each bore 151 are supplied with pump fluid from the inlet passage 152 through a substantially U-shaped bridge passage 158 having opposite branches 159–160 that intersect the bore at zones between the open center and service passages. When flow of pump fluid through the open center passage is blocked in consequence of movement of one or the other of the conventional spools to an operating position in its bore 151, fluid is diverted to one of its service passages via a feeder passage common both bridge passages.

As here schematically shown for purposes of clarity, each bridge passage 158 is communicated with the inlet passage 152 through a feeder passageway 162 containing a check valve 163 that closes in the direction to prevent fluid in the bridges from backing up into the inlet passage.

Two similar divided spool valve elements 164 and 165 of this invention are coaxially slidably mounted in each bore 151 in place of the substantially long spool ordinarily used therein. The spools 164 and 165 are normally yieldingly held in endwise abutting neutral positions as shown, by centering springs 166 in the opposite ends of the bores. Again, the ends of the bores are closed by covers which are provided with control ports C1 and C2 for the top pair of valve spools, and C3 and C4 for the bottom pair of valve spools. The opposite end portions of bores 151 thus provide pressure chambers 31 in communication with the control ports.

The spools 164 and 165 are tubular like those previously described, and similarly, each has opposite cup-like end portions. Their hollow interiors, of course, provide axial passages 33 which again open to the chambers 31 through restrictions 34. Each spool extends across one of the service passages 23–24 and is operable to selectively communicate the same with either the bridge passage 158 or the exhaust passage 157 through the central circumferential groove 21 in the spool, depending upon whether the spool is moved to the right or to the left from its neutral position.

The interiors of the cup-like end portions of each pair of spools at their abutting ends are somewhat smaller in diameter than before, but they nevertheless conjointly define a pressure chamber 32 in which a shuttle valve 168 is axially slidably received. The shuttle valve is pressure responsive, and is required in order to assure the balanced pressure conditions in chambers 31 and 32 necessary for the centering springs 166 to hold the pairs of valve spools 164 and 165 in their neutral positions at times when their control ports are blocked.

The shuttle valve 168 is normally held by springs 169 in a neutral position centered between opposing valve seats 170 (see FIGURE 18) in the bottoms of the adjacent cup-like ends of the spools and surrounding the mouths of the axial passages 33 opening to their interiors. Its periphery has longitudinal grooves 171 that provide a generous flow path along its exterior, leading from one axial passage 33 to the other in each pair of valve spools.

The opposite ends 172 of the shuttle valve are reduced in diameter to pass through the valve seats 170 and to substantially loosely fit into, with small clearance, the axial passages 33. These reduced ends define annular shoulders 173 which are engageable with the seats 170 but which are normally spaced therefrom as shown in FIGURE 17. Crossbores 174 in the reduced extremities of the shuttle valve are joined by an axial passage 175 therein, so that limited communication will be afforded between passages 33 when the shuttle valve is shifted into engagement with one or the other of its seats 170 (see FIGURE 18).

As shown, the inner end portions of the valve spools at all times block communication between passage 154 and both the inlet and outlet passages 152 and 153. The adjacent ends of the top spools 164–165 abut one another in passage 154 at end surfaces which are spaced radially inwardly from axially relieved outer portions of the spools, so that said axially relieved outer portions define a circumferential groove 176 at the abutting ends of the spools. The bottom spools 164–165 are similarly formed, but abut one another in the outlet passage 153.

Pressure fluid from either service passage 23–24 governed by the spools of each pair thereof is able to flow to their groove 176 through an axial passage 177 in each spool, leading from its central groove 21 to the axially relieved inner end portion of the spool. Each such passage 177 contains a check valve 178 that opens in the direction to permit fluid to flow to groove 175 from its associated service passage.

In operation, the spools 164 and 165 of each pair thereof will remain in their neutral positions shown as long as their control ports are blocked by the pilot valve (not shown) for said pair of spools. They will do so because the shuttle valve 168 therein will then be held in its neutral position at which fluid transfer between chambers 31 is facilitated, and pressures in said chambers will accordingly be equal.

Because of the shuttle valve in each pair of spools 164 and 165, and because of their normally abutting relation, each pair of spools can be moved as a unit to either the right or the left of neutral to selectively connect either service passage governed thereby with the supply passage and the other service passage with the exhaust passage. Such actuation of the spools of each pair thereof is effected at the command of the pilot valve therefor, which as before described, provides for venting either control port for said spools concurrently with delivery of pressurized control fluid to the other control port.

Thus, if pilot fluid is admitted to port C1 while port C2 is vented, the pressure of pilot fluid immediately acts on valve spool 164 to shift both spools to the right, and such pilot fluid also causes the shuttle valve to shift to the right to its position seen in FIGURE 18, at which it restricts fluid flow from central chamber 32 to the axial passage 33 in spool 165. The spools 164 and 165 will then be disposed in operating positions communicating service passage 23 with the inlet passage through branch 159 of the bridge passage 158, and communicating service passage 24 with the right-hand branch 157 of the exhaust passage. The spools 164–165, of course, are actuated in the opposite direction when pilot fluid is admitted to port C2 while port C1 is vented, to cause pump fluid to flow to service passage 24 from branch 160 of the bridge passage, and to cause return fluid to flow to the left-hand branch of the exhaust passage from service passage 23.

It should be noted that because the spools 164 and 165 can move independently of one another, either spool of each pair thereof can act as a check valve, or as a cylinder port relief valve which functions to connect an overpressured service passage with its exhaust passage as soon as pilot pressure drops due to opening of the high pressure relief valve in its pilot valve. For example, if for the aforesaid reason pilot pressure drops suddenly in chamber 31 for valve spool 164, high pressure fluid from service passage 23 will flow through the check valve controlled passage 177 in spool 164 to the central chamber 32 between the spools to quickly move spool 164 to its vent position communicating service passage 23 with the adjacent branch of the exhaust passage. Though the shuttle valve 168 can return to its neutral position at such a time, the pressure of cylinder fluid in chamber 32 will hold spool 165 in its vent position and will shift spool 164 to the left, relative to spool 165.

If at any time fluid pressure in service passage 23 exceeds the pressure of pump fluid being supplied thereto, spool 164 will be shifted, relative to spool 165, to its neutral position to thus serve as a check valve, in consequence of flow of pressure fluid from the service passage 23 through passage 177 in the spool to central chamber 32.

FIGURE 19 illustrates a slight modification of the basic valve spool that can be used to advantage under certain conditions to prevent unwanted response of the spool to pressure in its service passage, particularly at times when the spool is in an operating position. As therein seen, the valve spool 180 is provided with a pair of tubular valve-like damping plungers 181 and 182 which serve to effect substantial reduction in the pressure of fluid flowing to the pressure chambers at the ends of the spool from its service passage 23 (or 24).

The plungers 181 and 182 are axially slidably mounted in chambers 18 that are coaxial with the spool and open outwardly from the axial passage in the valve spool through the bottoms of its cup-like ends. The bottom of each chamber 183 is shaped to provide a conically surfaced annular seat 84 with which a nose on its plunger engages in response to predominating pressure in its adjacent pressure chamber (31 or 32) to constrain fluid in said chamber to flow toward the opposite chamber through an orifice 185 in the nose of the plunger.

The orifices substantially correspond in function to the restrictions 34 described hereinbefore. However, it will be noted that when either plunger is seated by predominating fluid pressure in its adjacent pressure chamber, the other plunger will be unseated to provide somewhat less restricted flow of fluid therepast, around the reduced seat engaging end portion of the plunger and through radial holes 186 therein and the larger diameter interior of the tubular plunger to the adjacent pressure chamber (31 or 32).

Washers 187 held by the centering springs 20 against the bottoms of the wells defined by the cup-like end portions of the valve spool, serve to limit movement of the plungers 181 and 182 off of their seats 184.

The damping plungers are especially useful in a metering position of the valve spool, to which it can be moved in response to setting of the pilot spool therefor in a corresponding metering position. A metering position such as referred to, for example, can be one where the service passage 23 receives pressure fluid from the supply passage 25 only through metering notches 188 in the spool. In the absence of the damping plungers 181 and 182 at such a time, any fluctuation in pressure in the service passage 23 could lead to hunting of the valve spool such as would alternately increase supply flow to service passage 23 upon drop in pressure in the latter, and to decrease or even close off flow of supply fluid to service passage 23 upon rise in pressure therein. The plungers 181 and 182, however, have an attenuating action which substantially cancels out the effects upon the valve spool of pressure fluctuations in service passage 23 (or 24).

From the foregoing description, together with the accompanying drawings, it will be apparent to those skilled in the art that this invention provides improved pilot controllable valve mechanism featuring divided spool valve elements, and which mechanism is far simpler and easier to produce, at less cost, than conventional spool valve mechanisms.

What is claimed as my invention is:

1. A control valve mechanism having supply and exhaust passage means and a pair of service passages to connect with the opposite sides of a reversible fluid motor, characterized by:
    (A) separate valve instrumentalities, one for each of said service passages,
        (1) said valve instrumentalities being movable relative to one another,
        (2) and each of said valve instrumentalities being actuatable to a feed position communicating its service passage with the supply passage means and being actuatable to a vent position communicating its service passage with the exhaust passage means;
    (B) means providing for actuation of one of said valve instrumentalities to its feed position to cause egress flow of supply pressure fluid from its service passage for delivery to one side of a controlled fluid motor;
    (C) and means rendered operative in consequence of ingress flow of motor exhaust fluid into the other service passage for effecting actuation of the other of said valve instrumentalities to its vent position.

2. The control valve mechanism of claim 1, wherein said other valve instrumentality is actuatable to its vent position by actuating means which is responsive to the pressure of motor exhaust fluid.

3. The control valve mechanism of claim 2, wherein said one valve instrumentality is actuatable to its feed position by actuating means responsive to pressure of control fluid from a source outside the control valve mechanism.

4. The control valve mechanism of claim 3, further characterized by
    (A) both valve instrumentalities being actuatable to their vent positions by actuating means responsive to pressure of motor exhaust fluid in their respect service passages;
    (B) and both valve instrumentalities being actuatable to their feed positions by actuating means responsive to pressure of control fluid in separate pressure chambers with which said valve instrumentalities are respectively associated.

5. The control valve mechanism of claim 1, further characterized by
   (A) each of said valve instrumentalities being fluid pressure responsive and having its own supply and exhaust passages;
   (B) a first pressure chamber for each valve instrumentality having a control port into which pressurized control fluid can flow to effect actuation of the valve instrumentality to its feed position;
   (C) and a second pressure chamber for each valve instrumentality, communicated with the service passage associated therewith.

6. The control valve mechanism of claim 5, wherein the feed and vent position of each of said valve instrumentalities are at opposite sides of a normal position, and further characterized by
   (A) said valve instrumentalities being mounted in a common bore and each comprising an elongated valve element endwise slidable in the bore;
   (B) biasing means acting on the valve elements to yieldingly hold the same in endwise abutting normal positions;
   (C) each end portion of the bore providing a first pressure chamber for the valve element adjacent thereto;
   (D) the adjacent end portions of the valve elements having wells which open axially toward one another and conjointly define a second pressure chamber common to both valve elements;
   (E) an axial passage in each valve element providing restricted communication between said first chamber and both its associated service passage and second chamber;
   (F) the mouths of said passageways opening to said wells and defining annular valve seats;
   (G) a pressure actuatable shuttle valve axially slidably mounted in said common second chamber between said valve seats, for engagement of either end thereof with the seat adjacent thereto, said shuttle valve being adapted to provide restricted communication between said axial passageways when engaged with either seat and to provide less restricted communication between said axial passageways when spaced from both seats;
   (H) means yieldingly biasing the shuttle valve to a neutral position spaced from both seats;
   (I) and a check valve controlled passage in each valve element leading to said common second chamber, providing for flow thereto of pressure fluid from the associated service passage.

7. The control valve mechanism of claim 5, further characterized by pilot means connected with the control ports for the first chambers of both of said valve instrumentalities, said pilot means having movable control means which in one position effects trapping of fluid in both of said first chambers, and which in either of a pair of working positions effects supply of pressurized control fluid to the first chamber of a selected one of said valve instrumentalities concurrently with exhaust of fluid from the first chamber of the other valve instrumentality.

8. The control valve mechanism of claim 7, further characterized by:
   (A) means providing an outlet header to which said exhaust passages lead;
   (B) restriction means in the outlet header;
   (C) means providing a bypass connecting with said supply passages and through which fluid in the latter can flow in by pass relation to the valve instrumentalities;
   (D) an unloading valve mechanism governing said bypass and having a pressure chamber connected with the pilot means so that the latter controls the pressure in said chamber and effects movement of the unloading valve mechanism toward a closed position in response to rise in pressure in said chamber as a consequence of movement of the pilot control means to either of its working positions;
   (E) means providing a duct communicating the chamber of the unloading valve mechanism with a portion of the outlet header upstream from said restriction means;
   (F) and a check valve normally closing said duct and adapted to open in response to rise in pressure of fluid in said upstream portion of the outlet header to a predetermined value, to allow pressurized fluid from the outlet header to flow to the chamber of the unloading valve mechanism and impart closing motion to the latter.

9. The control valve mechanism of claim 7, wherein said pilot control means is movable to another position at which it vents said control ports of both valve instrumentalities.

10. The control valve mechanism of claim 5, further characterized by:
    (A) restriction means restricting flow through the exhaust passage of one of said valve instrumentalities;
    (B) means providing a duct communicating the service passage of the other valve instrumentality with said last mentioned exhaust passage at a location upstream from said restriction means;
    (C) and a check valve normally closing said duct and arranged to open in response to pressure of fluid in said last designated exhaust passage at a value exceeding that of fluid in its associated service passage.

11. The control valve mechanism of claim 5 further characterized by:
    (A) means providing an outlet duct to which the exhaust passages of both valve instrumentalities lead;
    (B) means providing a restriction in said outlet duct;
    (C) means providing a bypass for communicating the service passage of one of said valve instrumentalities with its associated exhaust passage;
    (D) and a check valve normally closing said bypass and arranged to open in response to pressure of fluid in said last designated exhaust passage at a value exceeding that of fluid in its associated service passage.

12. The control valve mechanism of claim 5, further characterized by:
    (A) means providing an inlet header communicating the supply passages of said valve instrumentalities with one another and with a common inlet;
    (B) means providing an outlet header communicating the exhaust passages of said valve instrumentalities with one another and with a common outlet;
    (C) means providing a restriction in said outlet header, through which fluid flowing to the outlet from the exhaust passage of either valve instrumentality must pass;
    (D) duct means for communicating the exhaust header with the inlet header;
    (E) and a check valve normally closing said duct means and arranged to open in response to pressure of fluid in the exhaust header at a value exceeding that of fluid in the inlet header.

13. The control valve mechanism of claim 5, further characterized by:
    (A) restriction means restricting flow through the exhaust passage of one of said valve instrumentalities;
    (B) duct means communicating the first pressure chamber of one of said valve instrumentalities with said last mentioned exhaust passage at a location upstream from said restriction means;
    (C) and a check valve normally closing said duct means and arranged to open in response to pressure of fluid in said last mentioned exhaust passage at a value exceeding the pressure of fluid in the first pressure chamber of said one valve instrumentality to effect actuation of the valve means thereof to its feed position.

14. The control valve mechanism of claim 5, further characterized by:
   (A) means providing a restriction in the exhaust passage of one of said valve instrumentalities;
   (B) passage means communicating a portion of said last named exhaust passage upstream from said restriction with said second pressure chamber of the other of said valve instrumentalities;
   (C) and a piston in said last mentioned pressure chamber for actuating the valve means associated therewith to its vent position in response to rise in the pressure of fluid in said upstream portion of the last mentioned exhaust passage to a predetermined value.

15. The control valve mechanism of claim 5, further characterized by:
   (A) said supply passages being communicated with one another and with a common inlet for pressure fluid;
   (B) a normally closed check valve for said inlet, arranged to open whenever pressure of fluid at the inlet exceeds the pressure in either supply passage;
   (C) duct means through which fluid in the second pressure chamber of one of said valve instrumentalities can be expelled to its associated supply passage;
   (D) and a check valve normally blocking fluid flow through said duct means, but arranged to open in the direction to allow fluid to flow out of said last mentioned pressure chamber to the supply passage of said last designated valve instrumentality.

16. The control valve mechanism of claim 15, further characterized by a pilot valve connected with said control ports of the valve instrumentalities to provide for delivery of pressurized control fluid to either control port concurrently with venting of the other control port, said pilot valve further providing for concurrent delivery of pressurized control fluid to said control ports of both valve instrumentalities so as to effect actuation thereof to their feed positions, and hence to effect communication of the service passages with one another through the commonly connected supply passages.

17. The control valve mechanism of claim 5, further characterized by:
   (A) a pilot valve connected with said control ports of both valve instrumentalities to provide for delivery of pressurized control fluid to either of said control ports concurrently with venting of the other control port, said pilot valve further providing for simultaneous venting of both of said control ports so that either valve instrumentality can be moved to its vent position in response to increase of pressure in its service passage;
   (B) said exhaust passages being communicated with one another and with a common outlet;
   (C) restriction means restricting flow of exhaust fluid to said outlet;
   (D) a duct connecting each service passage with its associated exhaust passage;
   (E) and a normally closed check valve in each of said ducts, arranged to open whenever fluid pressure in its associated exhaust passage exceeds the pressure of fluid in its associated service passage.

18. A control valve mechanism comprising a second pair of valve instrumentalities as claimed in claim 5, wherein each of said valve instrumentalities has a nominal position intermediate its feed and vent positions, the service passages of which are connectable with the opposite sides of another reversible fluid motor, and further characterized by:
   (A) said valve mechanism having a common inlet for supply fluid under pressure, and a common outlet;
   (B) the supply passage of each valve instrumentality of said second pair thereof being communicable with the inlet through an associated one of the valve instrumentalities of said first pair thereof in only the normal position of the latter;
   (C) the exhaust passage of each valve instrumentality of the first pair thereof being communicable with the outlet through its associated valve instrumentality of said second pair thereof in only the normal position of the latter;
   (D) duct means communicating the exhaust passage of one valve instrumentality of said first pair thereof with the supply passage of its associated one of the valve instrumentalities of the second pair thereof;
   (E) and check valve means normally closing said duct means and arranged to open in the direction to permit fluid to flow from said last designated exhaust passage to said last designated supply passage.

19. The control valve mechanism of claim 18, wherein said duct means commonly communicates both exhaust passages of the first pair of valve instrumentalities with the supply passages of the second pair of valve instrumentalities so that pressure fluid in either of said last named exhaust passages will flow to the supply passage of either of said second pair of valve instrumentalities past said check valve means whenever the last mentioned valve instrumentality is in its feed position.

20. A control valve mechanism comprising upstream and downstream pairs of valve instrumentalities as claimed in claim 5, each having service passages connectable with the opposite sides of a different reversible fluid motor, and further characterized by:
   (A) the supply and exhaust passages of each pair of valve instrumentalities respectively connecting with supply and exhaust headers;
   (B) a common supply fluid inlet connecting with the supply header of the upstream pair of valve instrumentalities;
   (C) a common exhaust fluid outlet connecting with the exhaust header of the downstream pair of valve instrumentalities;
   (D) supply duct means through which the supply header of the downstream pair of valve instrumentalities is fed from the supply header of the upstream pair of valve instrumentalities;
   (E) exhaust duct means through which the exhaust header of the upstream pair of valve instrumentalities is communicated with the exhaust header of the downstream pair of valve instrumentalities;
   (F) first valve means rendered operative to block said supply duct means in consequence of actuation of either of the upstream pair of valve instrumentalities to its feed position;
   (G) second valve means rendered operative to block said exhaust duct means in consequence of actuation of either of the downstream pair of valve instrumalities to its feed position;
   (H) and means operable in consequence of such blocking of the exhaust duct means for diverting exhaust fluid from the exhaust header of the upstream pair of valve instrumentalities to the supply header of the downstream pair of valve instrumentalities.

21. The control valve mechanism of claim 5, further characterized by:
   (A) a substantially flat body having
      (1) opposite parallel faces,
      (2) a pair of bores disposed on axes parallel to one another and to said opposite faces, said bores providing valve receiving chambers in which said valve instrumentalities operate,
      (3) and the opposite ends of both bores providing said pressure chambers;
   (B) the supply and exhaust passages extending through the body at zones intermediate said bores and opening to the opposite faces of the body;
   (C) each of said supply and exhaust passages comprising opposite branch passages which extend outwardly toward and intersect said bores;

(D) and service passages in the body, one for each bore and communicating therewith.

22. The control valve of claim 21, wherein said service passages open laterally outwardly from their respective bores, to sides of the body which are remote from one another.

23. The control valve of claim 21, further characterized by:
  (A) said bores extending across the body and opening to opposite sides thereof;
  (B) and covers secured to said opposite sides of the body to close the ends of the bores, one of said covers having said control ports therein.

References Cited
UNITED STATES PATENTS

| | | | |
|---|---|---|---|
| 3,230,841 | 1/1966 | York | 137—596.18 XR |
| 2,933,105 | 4/1960 | Jerman | 137—596.18 XR |
| 3,402,736 | 9/1968 | Tricic | 137—596.12 |

HENRY T. KLINKSIEK, Primary Examiner

U.S. Cl. X.R.

137—596.18, 596.2

PO-1050
(5/69)

UNITED STATES PATENT OFFICE
CERTIFICATE OF CORRECTION

Patent No. 3,464,443     Dated September 2, 1969

Inventor(s) F.H. Tennis

It is certified that error appears in the above-identified patent and that said Letters Patent are hereby corrected as shown below:

Column 1, line 16 the word "vale" should read -- valve -
Column 1, line 25 the word "systms" should read -- systems --
Column 5, line 49 "conrtol" should read -- control -- . Colu
5, line 49 the word "port" is illegible. Column 5, line 68
"passages" should read -- passage --. Column 10, line 67
the word "positivaly" should read -- positively --. Column 1
line 36 "pivot" should read -- pilot -- . Column 14, line 4
"spools 94 and 96" should read -- spools 93 and 96 -- . Colu
14, line 54 the word "and" is misspelled. Column 21, line 62
delete "instrumentalities consurrently with exhaust of".
Column 24, line 52 the word "instrumentalities" is misspelled

SIGNED AND
SEALED
MAY 12 1970

(SEAL)
Attest:

Edward M. Fletcher, Jr.
Attesting Officer

WILLIAM E. SCHUYLER, JR.
Commissioner of Patents